(12) United States Patent
Somoza et al.

(10) Patent No.: US 11,858,353 B2
(45) Date of Patent: Jan. 2, 2024

(54) TRANSMISSION PLATFORM METHOD AND DEVICES

(71) Applicants: Karin M Somoza, Los Angeles, CA (US); Curtis Somoza, Los Angeles, CA (US); Eleanor Somoza, Los Angeles, CA (US)

(72) Inventors: Karin M Somoza, Los Angeles, CA (US); Curtis Somoza, Los Angeles, CA (US); Eleanor Somoza, Los Angeles, CA (US)

( * ) Notice: Subject to any disclaimer, the term of this patent is extended or adjusted under 35 U.S.C. 154(b) by 0 days.

(21) Appl. No.: 17/968,045

(22) Filed: Oct. 18, 2022

(65) Prior Publication Data
US 2023/0053133 A1     Feb. 16, 2023

Related U.S. Application Data

(63) Continuation-in-part of application No. 17/829,210, filed on May 31, 2022, which is a continuation of application No. 17/488,020, filed on Sep. 28, 2021, now Pat. No. 11,345,226, which is a continuation of application No. 14/202,208, filed on Mar. 10, 2014, now Pat. No. 9,574,661.

(60) Provisional application No. 61/778,189, filed on Mar. 12, 2013.

(51) Int. Cl.
*B60K 6/10* (2006.01)
*B60K 25/02* (2006.01)
*B60K 6/30* (2007.10)
*B60K 6/365* (2007.10)
*B60K 6/543* (2007.10)

(52) U.S. Cl.
CPC ............... *B60K 6/105* (2013.01); *B60K 6/30* (2013.01); *B60K 6/365* (2013.01); *B60K 6/543* (2013.01); *B60K 25/02* (2013.01)

(58) Field of Classification Search
CPC .......... B60K 6/105; B60K 6/30; B60K 6/365; B60K 6/543; B60K 25/02
See application file for complete search history.

(56) References Cited

U.S. PATENT DOCUMENTS

| | | | | |
|---|---|---|---|---|
| 7,416,039 | B1 * | 8/2008 | Anderson | B60K 6/30 180/165 |
| 7,540,346 | B2 * | 6/2009 | Hu | B60K 6/543 180/165 |
| 8,967,305 | B2 * | 3/2015 | Manganaro | B60L 50/30 180/165 |
| 9,358,865 | B1 * | 6/2016 | Sherry | B60W 30/04 |

* cited by examiner

*Primary Examiner* — John D Walters
(74) *Attorney, Agent, or Firm* — Edmond DeFrank

(57) ABSTRACT

The embodiments disclose a method including separating kinetic speed from energy using a transmission platform, directing energy in the kinetic form at a predetermined speed from 0 to 100%, employing the transmission platform with fewer pieces to increase overall efficiency at a lower cost to produce, and integrating the transmission platform with combustion engines and electric motors to achieve more efficiency and greater performance.

19 Claims, 27 Drawing Sheets

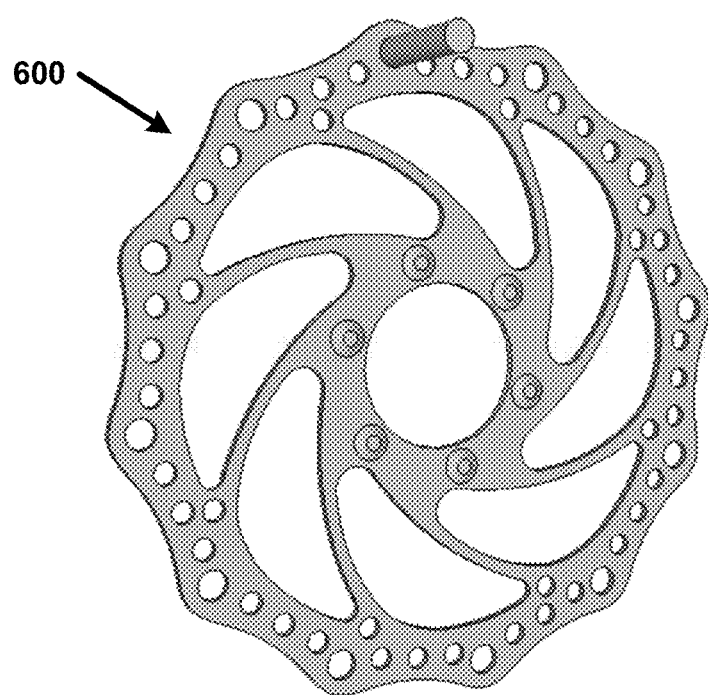
FIG. 6A
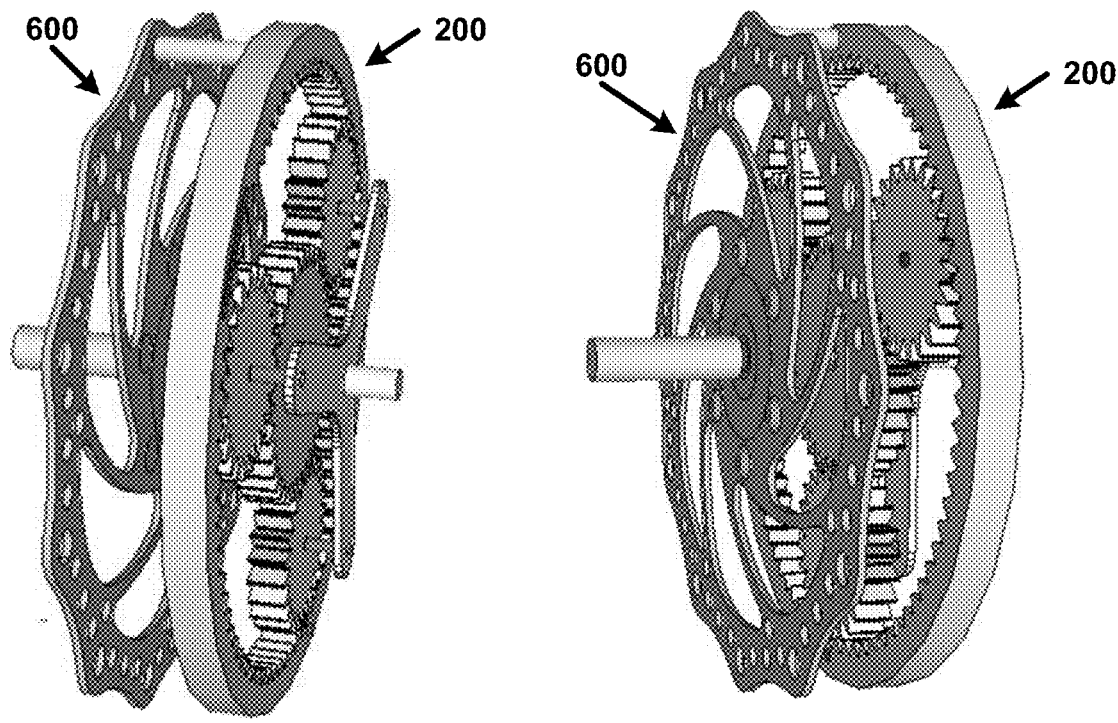
FIG. 6B     FIG. 6C

```
┌─────────┐
│ FIG. 17 │
└─────────┘
     │
     ▼
┌──────────────────────────────────────────────────────────────┐
│ THE SPEED THE GATE OPERATES AT IS ADJUSTABLE VIA             │ 1800
│ COMPUTER CONTROLLED MODULE THAT TAKES INPUTS FROM            │
│ THE SOURCE, THE DESIRED NEED AND THE (KETD) ITSELF           │
└──────────────────────────────────────────────────────────────┘
     │
     ▼
┌──────────────────────────────────────────────────────────────┐
│ TO CONTROL THE SPEED OF THE OUTPUT SHAFT OF THE              │ 1810
│ (KETD), THE GATE SLOWS ITSELF UNTIL THE FORCE DESIRED IS     │
│ MEASURED AT THE GATE WHICH IN TURN WILL SEND THAT            │
│ EXACT AMOUNT OF FORCE OUT THE OUTPUT SHAFT                   │
└──────────────────────────────────────────────────────────────┘
     │
     ▼
┌──────────────────────────────────────────────────────────────┐
│ THE SPEED THAT FORCE EXITS EQUALS THE INPUT SPEED            │ 1820
│ MINUS THE SPEED OF THE GATE                                  │
└──────────────────────────────────────────────────────────────┘
     │
     ▼
┌──────────────────────────────────────────────────────────────┐
│ THE SLOWER THE GATE MOVES, THE FASTER THE OUTPUT             │ 1830
│ SHAFT AND VICE VERSA                                         │
└──────────────────────────────────────────────────────────────┘
     │
     ▼
┌──────────────────────────────────────────────────────────────┐
│ THE COMPUTERIZED SPEED CONTROL MODULE MEASURES               │ 1840
│ FORCE AND NOT JUST SPEED                                     │
└──────────────────────────────────────────────────────────────┘
     │
     ▼
┌──────────────────────────────────────────────────────────────┐
│ MEASURING FORCE IN ADDITION TO SPEED ALLOWS THE              │ 1850
│ SOURCE TO PROVIDE ENERGY IN THE MOST EFFICIENT MEANS         │
└──────────────────────────────────────────────────────────────┘
     │
     ▼
┌──────────────────────────────────────────────────────────────┐
│ IN INSTANCES WHERE ENERGY IS DESIRED TO BE RECOVERED,        │ 1860
│ THE MODULE CONTROLS THE GATE SPEED AND FORCE TO              │
│ TRANSFER ENERGY FROM THE OUTPUT SHAFT BACK TO THE            │
│ SOURCE                                                       │
└──────────────────────────────────────────────────────────────┘
     │
     ▼
┌──────────────────────────────────────────────────────────────┐
│ THE MODULE CALCULATES THE DESIRED VALUES AND MAKES           │ 1870
│ ADJUSTMENTS MANY TIMES A SECOND TO PROVIDE THE MOST          │
│ EFFICIENT USE OF ENERGY FROM THE SOURCE                      │
└──────────────────────────────────────────────────────────────┘
```

FIG. 18

TRANSMISSION PLATFORM METHOD AND DEVICES

CROSS-REFERENCE TO RELATED APPLICATIONS

This Patent Application is a continuation-in-part application based on pending U.S. Non-Provisional patent application Ser. No. 17/829,210 filed May 31, 2022, entitled "KINETIC ENERGY TRANSFERENCE DEVICE METHOD AND DEVICES", by Karin M Somoza, the U.S. Patent Application is incorporated herein by reference.

BACKGROUND

Modern combustion engines have narrow operating ranges where they are either the most efficient or produce the most power. Electric motors also have efficient operating ranges although they are broader than combustion engines. Matching the best performance of engines or motors with the desired needs means auto manufacturers use complex and expensive multi-speed transmissions or none at all in many EVs. The best way to match the efficiency of engines and motors with needs is with a Continually Variable Transmission but current designs can be very inefficient due to their need to use friction to create the variable ratios needed. The inefficiency of other CVTs negates gains from the use of a CVT when applied to moderate to high horsepower applications.

BRIEF DESCRIPTION OF THE DRAWINGS

FIG. 6A shows for illustrative purposes only an example of a lobed disc of one embodiment.

FIG. 6B shows for illustrative purposes only an example of a lobed disc coupled to a planetary gear set from the gear set prospective of one embodiment.

FIG. 6C shows for illustrative purposes only an example of a lobed disc coupled to a planetary gear set from the lobed disc prospective of one embodiment.

FIG. 18 shows a block diagram of an overview of the KETD features of one embodiment.

DETAILED DESCRIPTION OF THE INVENTION

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a transmission platform method and devices is described for illustrative purposes and the underlying system can apply to any number and multiple types of combustion engines and electric motors. In one embodiment of the present invention, the transmission platform method and devices can be configured using an electronic control box. The transmission platform method and devices can be configured to include a planetary gear and can be configured to include a speed governor using the present invention.

Figure 1:
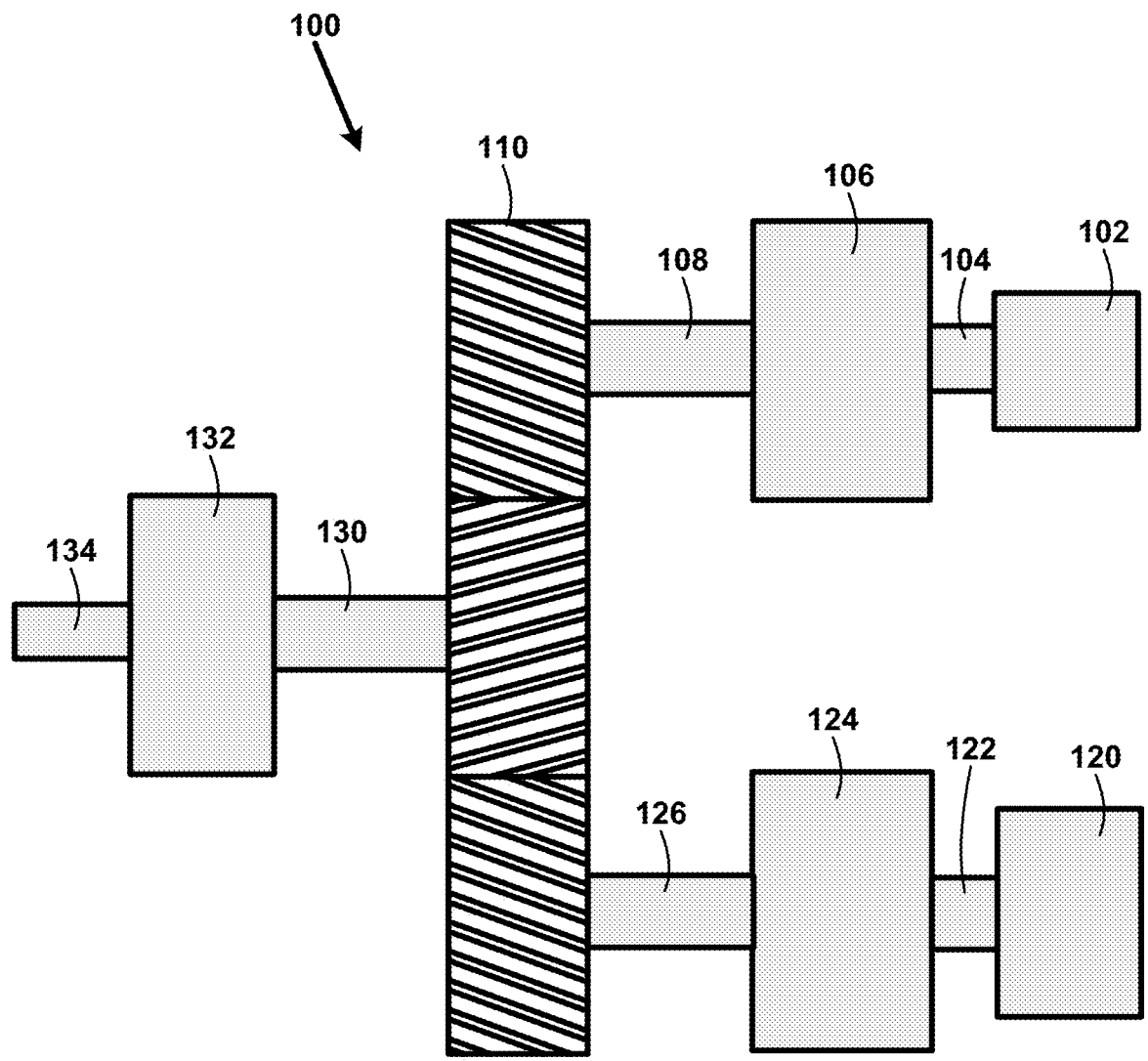
FIG. 1 shows for illustrative purposes only an example of a kinetic energy transference device of one embodiment.

FIG. 1 shows for illustrative purposes only an example of a kinetic energy transference device of one embodiment. FIG. 1 shows a kinetic energy transference device 100 with a primary kinetic source for example a gas engine 102 transferring force through the primary kinetic source axle 104 of FIG. 1 to CVT planetary gear system and gate #1 106. The transferred force is input #1 108 which is transferred to a planetary gear set 110. The transferred force is stored in the flywheel storage system 120 through the CVT planetary gear system secondary kinetic axle 122 and gate #2 124 in one instance. In another instance, force is transferred from the flywheel storage system 120 through the CVT planetary gear system and gate #2 124 to INPUT #2 axle 126 to the planetary gear set 110.

In one embodiment from the planetary gear set 110 force (kinetic energy) is transferred to an automobile wheel 134 through an output automobile wheel 130 axle through a CVT planetary gear system and gate #3 132. In another embodiment force (kinetic energy) is transferred from the automobile wheel 134 through the CVT planetary gear system and gate #3 132 and output automobile wheel 130 axle to the planetary gear set 110. This force is stored in the flywheel storage system 120 in one embodiment.

The kinetic energy transference device (KETD) 100 is integrated into a continually variable transmission (CVT) planetary gear system 110. A primary kinetic source is coupled to the primary kinetic source axle 104. The primary kinetic source axle 104 is coupled to the primary kinetic source transfer gear. A first-speed-governed kinetic energy transfer gear coupled to the first-speed governor transfers the measured amount of kinetic energy needed to provide the most efficient use of the energy for a first operation through the first-speed-governed kinetic energy axle.

The excess speed is always transferred into the moving gate. This moving gate flows at the speed that is subtracted from the input speed to provide the desired output speed. No excess speed leaves the CVT planetary gear system. The speed is divided into two paths, with one being the speed of the gate and the other being to flow out to the desired load. The first computer-controlled module analyses the kinetic energy imparted from the primary kinetic source and the kinetic energy needed to provide the most efficient use of the energy for a first operation to determine the measured amount of kinetic energy to transfer through the first speed governor. The measured amount of kinetic energy determined is transmitted to the first speed governor. The first speed governor adjusts the kinetic energy control devices to impart the measured amount of kinetic energy to the first speed-governed kinetic energy axle.

Data received from the second operation system is processed in the second computer-controlled module and analyzed to determine the current kinetic energy needed for the second operation. The second speed governor makes adjustments in the kinetic energy control devices to transfer additional kinetic energy to the second operation system. The additional kinetic energy from the stored kinetic energy is transferred from the KETD flywheel surplus kinetic energy transfer gear to a second speed-governed kinetic energy transfer gear coupled to a second speed-governed etic energy axle.

The KETD flywheel surplus kinetic energy transfer gear is coupled to the third computer-controlled module that is coupled to the KETD flywheel surplus kinetic energy axle. The third computer-controlled module receives data from the first computer-controlled module and the second computer-controlled module. The data received from the two modules is analyzed by the third computer-controlled module to determine how much surplus kinetic energy to transfer to one of the operations of one embodiment.

DETAILED DESCRIPTION

Figure 2:
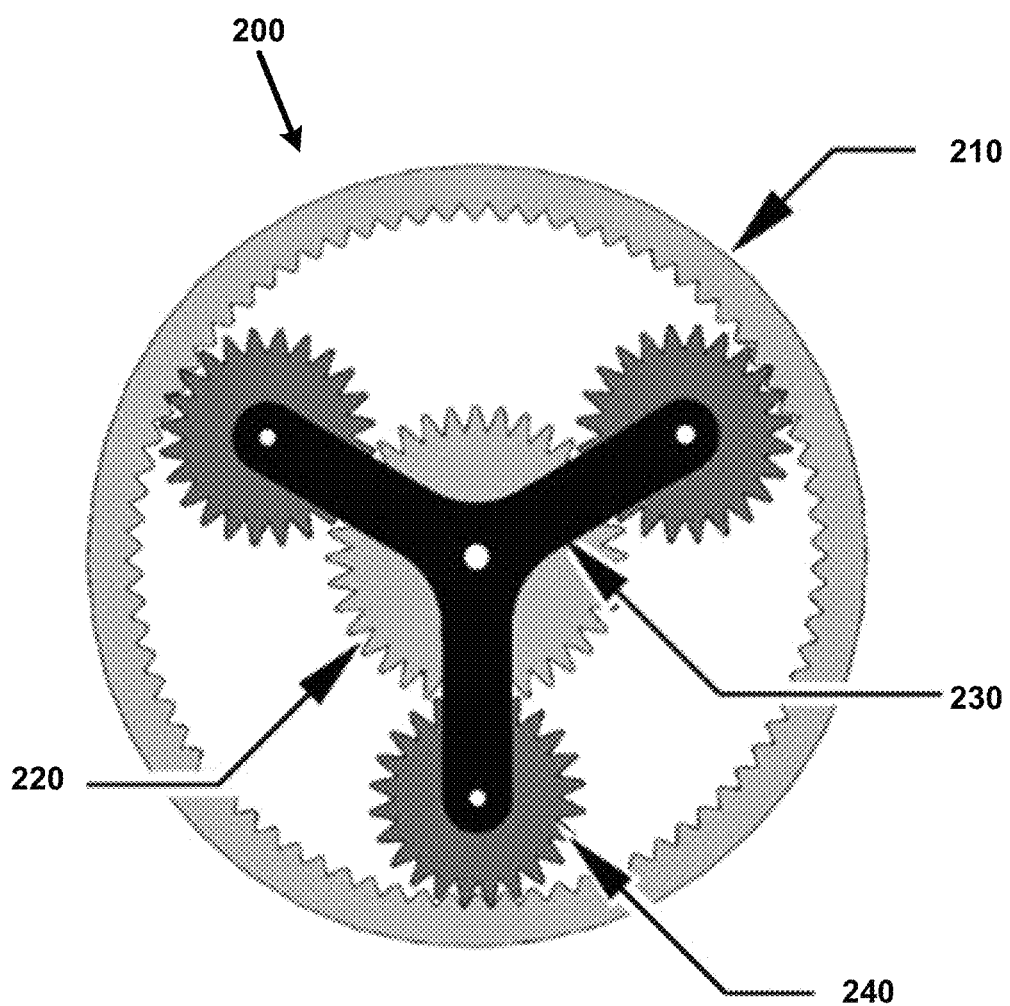
FIG. 2 shows for illustrative purposes only an example of a planetary gear system of one embodiment.

FIG. 2 shows for illustrative purposes only an example of a planetary gear system of one embodiment. FIG. 2 shows a planetary gear system 200 forming a kinetic energy transfer gear set connected to the CVT planetary gear system 110 of FIG. 1. A sun gear 220 is connected to the input side of the CVT planetary gear system 110 of FIG. 1 and each planet gear 240. A planetary carrier 230 is connected to the output side of the CVT planetary gear system 110 of FIG. 1 and each planet gear 240. A ring gear 210 is connected to the Speed Governor. The speed of the sun gear 220 (input) minus the speed of the ring gear 210 also referred to as a speed governor equals the speed of the planetary carrier 230 (Output). This calculation assumes the gears are equal in size. A change in the proportion of the gears will change the ratio but the overall effect is the same.

Flywheel Storage System

Figure 3A:
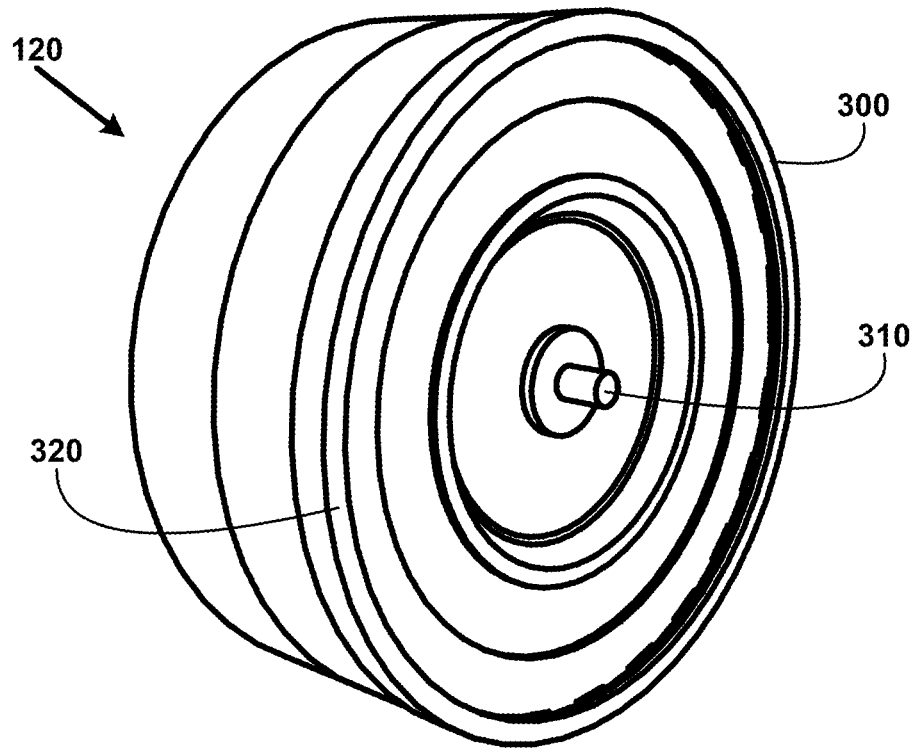
FIG. 3A shows for illustrative purposes only an example of a flywheel storage system of one embodiment.

FIG. 3A shows for illustrative purposes only an example of a flywheel storage system of one embodiment. FIG. 3A shows a flywheel storage system 120 in a flywheel containment 300 housing. The flywheel containment 300 housing includes an airtight case 320 allowing a vacuum to be created inside flywheel containment housing 300. A flywheel axle 310 is rotated with a speed and force delivered through a coupled planetary gear system 200 of FIG. 2 kinetic energy transfer drive train of one embodiment.

The primary kinetic energy source of the flywheel storage system 120. The flywheel storage system 120 is coupled to the continually variable transmission (CVT) planetary gear system 110. The CVT planetary gear system 110 is integrated with a multiple-axis mechanism kinetic energy transference device. The multiple-axis mechanism kinetic energy transference devices include multiple gates or speed governors, wherein each is configured to include a computer-controlled module. The computer-controlled modules process operational data to determine a measured most efficient use of the kinetic energy for each operation.

The measured most efficient use amount of the kinetic energy for each operation is transmitted to the multiple gates or speed governors. The multiple gates or speed governors make adjustments in speed many times a second. The adjusted speeds transfer of the measured amount of kinetic energy for each operation is made through multiple gears and output shafts/drive shafts to serve each operation. Surplus kinetic energy not needed for operations is stored in the flywheel storage system of one embodiment.

Flywheel in a Vacuum

Figure 3B:
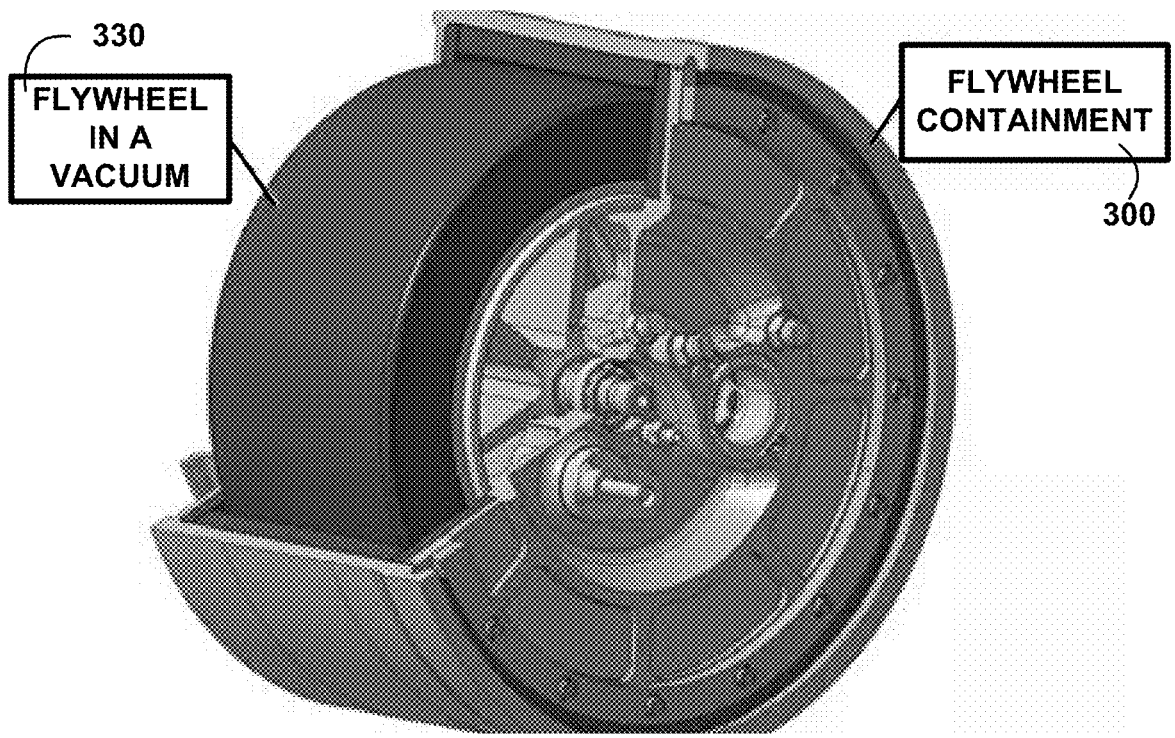
FIG. 3B shows for illustrative purposes only an example of a vacuum-sealed flywheel storage system of one embodiment.

FIG. 3B shows for illustrative purposes only an example of a vacuum-sealed flywheel storage system of one embodiment. FIG. 3B shows a cut-away of the flywheel containment 300 housing. The cut-away of the flywheel containment 300 housing reveals a flywheel in a vacuum 330. The creation of the vacuum surrounding the flywheel reduces drag that would be caused by air within the airtight case 320 of FIG. 3A increasing the efficiency of the flywheel of one embodiment.

Speed and Force Control Module

Figure 4:
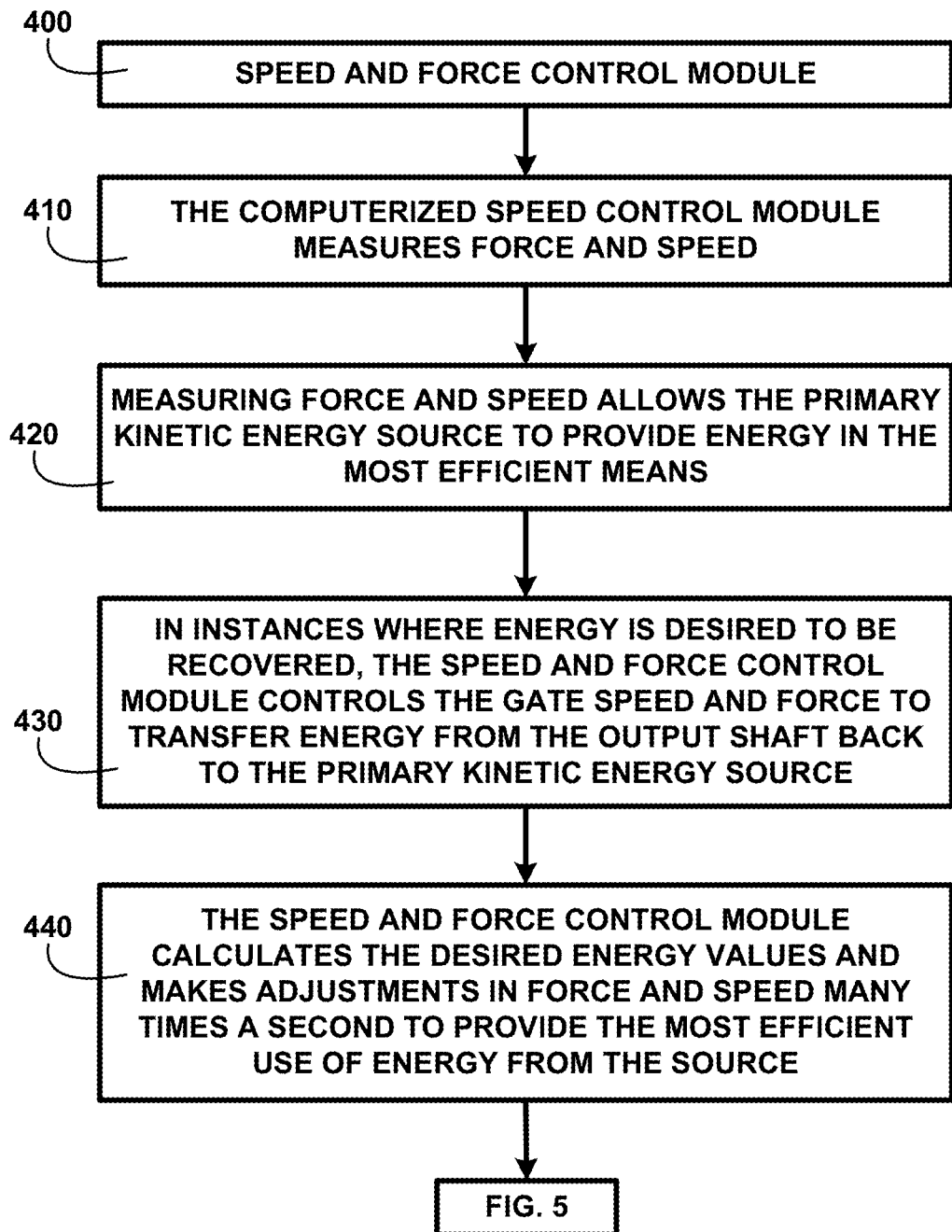
FIG. 4 shows a block diagram of an overview of a speed and force control module of one embodiment.

FIG. 4 shows a block diagram of an overview of a speed and force control module of one embodiment. FIG. 4 shows a speed and force control module 400. The computerized speed control module measures force and speed 410. Measuring force and speed allows the primary kinetic energy source to provide energy in the most efficient means 420. In instances where energy is desired to be recovered, the speed and force control module controls the gate speed and force to transfer energy from the output shaft back to the primary kinetic energy source 430. The speed and force control module calculates the desired energy values and makes adjustments in force and speed, many times a second to provide the most efficient use of energy from the source 440 of one embodiment.

In a system that only has an engine (power source) and an output (Automobile wheel), only one CVT planetary gear system is required since there is only one path energy can travel between the power source and automobile wheel. Regardless of which direction the energy is flowing, it can only flow through one path.

In a system where a third input/output is added, two more CVT planetary gear systems are required to cover the 2 additional paths to function with the one added force source. For example, in a system with an engine (Gas), a Flywheel storage system 120 of FIG. 1, and an automobile wheel, three CVT planetary gear systems are needed for the three different paths energy can flow. Path 1: Energy can run from the Engine to the Automobile wheel and back if needed. Path 2: Energy can run from the Engine to the Flywheel and back if needed. Path 3: Energy can run from the Flywheel to the Automobile wheel and back if needed.

There is a need for each source to have a CVT planetary gear system 120 of FIG. 1 because, in order to force energy into the desired location, the gate on the side that is not accepting or delivering the energy needs to be resisting and at a higher level than the receiving side. If you are directing energy being recovered from the Automobile wheel into the Flywheel, the Gate on the Engine side must be resisting at a higher level than the flywheel in order to force that energy into the flywheel.

When working with two or more CVT planetary gear systems with their corresponding Gate control module, a Master Control Module must be in place to correspond with the different gate controls. Continuous monitoring of the energy demands and availability is needed to properly set the correct gate speed and force of the different CVT planetary gear system 120 of FIG. 1 gates in order to properly direct the transference of energy to and from its desired locations. Each CVT planetary gear system 120 of FIG. 1 is controlled by its own force control module. Each force control module is controlled by a Master Control Module. The master control module sets the speed and/or pressure of the CVT planetary gear system speed governors/gates to direct the energy in the direction desired. Other embodiments include an electric motor/generator in place of the gas engine with batteries to store and deliver energy.

A first-speed-governed kinetic energy transfer gear coupled to the first-speed governor 842 transfers the measured amount of kinetic energy needed to provide the most efficient use of the energy for a first operation through the first-speed governed kinetic energy axle 844. The excess speed not needed for the first operation is transferred out a separate path to a KETD flywheel surplus kinetic energy transfer gear. The first computer-controlled module 840 includes the first digital processor and the first transceiver.

Figure 7:
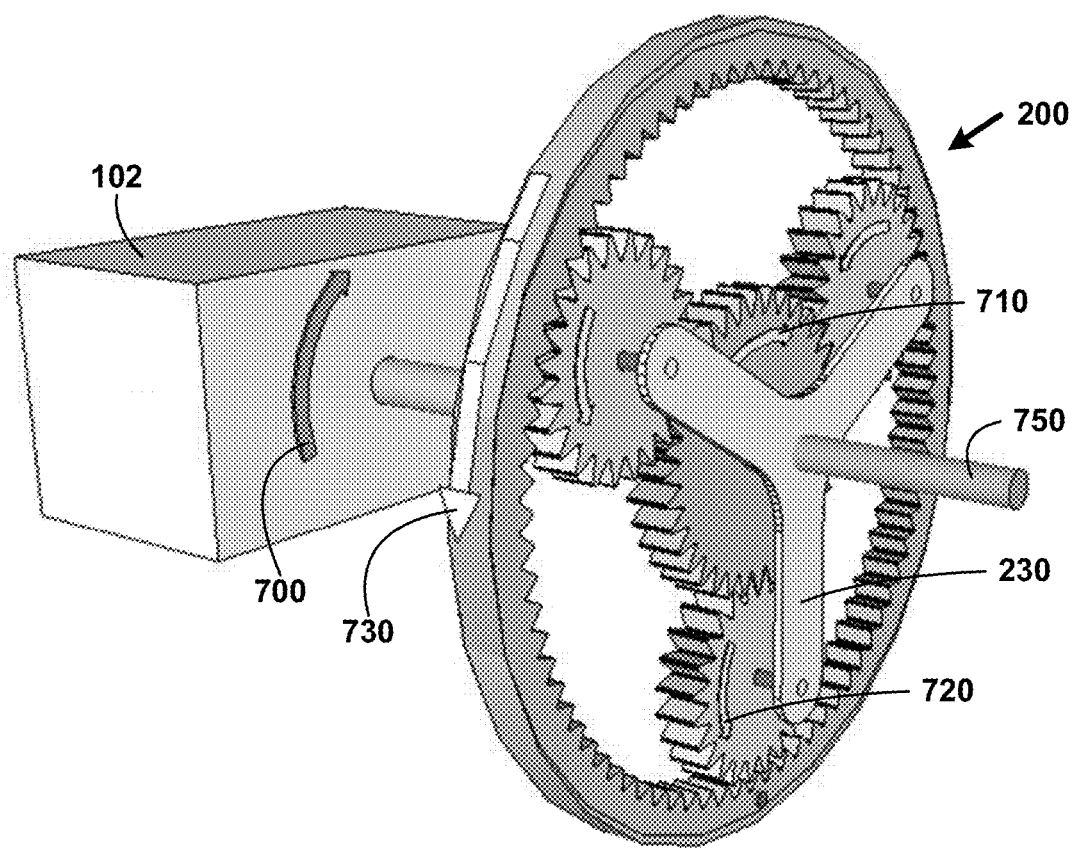
FIG. 7 shows for illustrative purposes only an example of planetary gear set movement of one embodiment.

The first computer-controlled module 840 using the first digital processor analyses the kinetic energy imparted from the primary kinetic source 700 of FIG. 7 and the kinetic energy needed to provide the most efficient use of the energy for a first operation to determine the measured amount of kinetic energy to transfer through the first-speed governor 842. The measured amount of kinetic energy determined is transmitted using wirelessly bidirectional signals from a first transceiver to the first-speed governor 842. The first-speed governor 842 adjusts the kinetic energy control devices to impart the measured amount of kinetic energy to the first-speed-governed kinetic energy axle 844.

Data is received through a second transceiver from the second operation system. The data provided is processed in the second computer-controlled module 850 where a second digital processor analyses the current kinetic energy needed for the second operation and existing kinetic energy being received to determine if additional kinetic energy is needed or whether the existing kinetic energy being received is more than the current kinetic energy needed creating a surplus of kinetic energy.

The determination of a shortfall or surplus is transmitted in this instance over hard-wired cabling instead of using the second-speed governor 852 installed transceiver. The second-speed governor 852 makes adjustments in the kinetic energy control devices to in one embodiment transfer additional kinetic energy to the second operation system, for example, a braking system through the second-speed governed kinetic energy axle 854.

In another embodiment, a transfer of the surplus kinetic energy from the second operation system to the second speed-governed kinetic energy transfer gear is made through the second speed-governed kinetic energy axle 854. In the latter instance, any surplus kinetic energy obtained from the second operation is transferred from the second speed-governed kinetic energy transfer gear to the KETD flywheel surplus kinetic energy transfer gear.

The KETD flywheel surplus kinetic energy transfer gear is coupled to the third computer-controlled module that is coupled to the KETD flywheel surplus kinetic energy axle. The third computer-controlled module includes a third digital processor and a third transceiver. The third transceiver receives data from the first computer-controlled module 840 and the second computer-controlled module 850. The data received from the two modules is analyzed by the third digital processor to determine where and how much kinetic energy to transfer surplus kinetic energy and how much surplus kinetic energy is coming from the two sources if applicable of one embodiment. The description continues in FIG. 5.

Gate or Speed Governor

Figure 5:
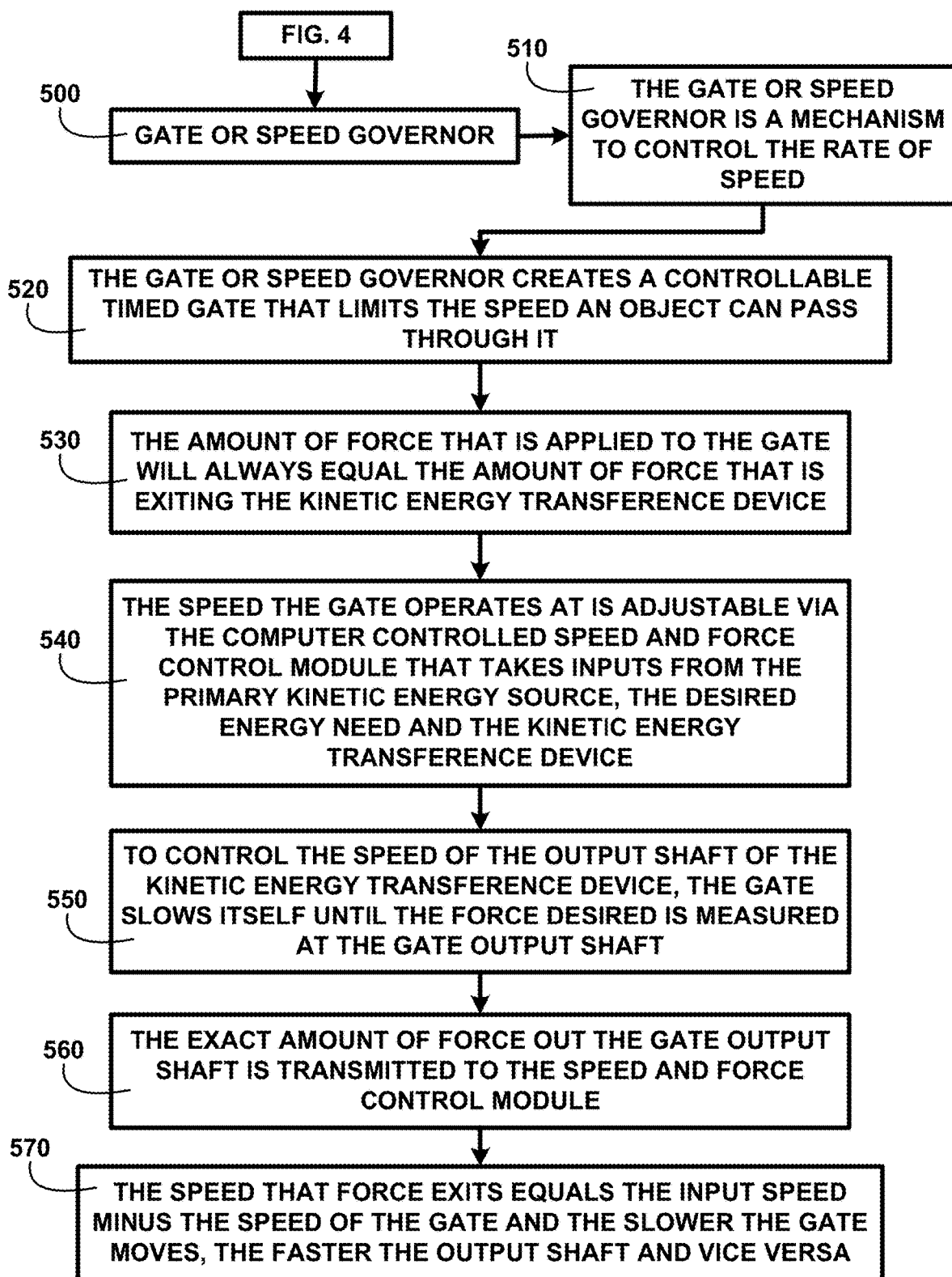
FIG. 5 shows a block diagram of an overview of a gate or speed governor of one embodiment.

FIG. 5 shows a block diagram of an overview of a gate or speed governor of one embodiment. FIG. 5 shows a continuation from FIG. 4 showing a gate or speed governor 500. The gate or speed governor is a mechanism to control the rate of speed 510. The gate or speed governor creates a controllable timed gate that limits the speed an object can pass through it 520. The amount of force that is applied to the gate will always equal the amount of force that is exiting the kinetic energy transference device 530. The speed the gate operates at is adjustable via the computer-controlled speed and force control module that takes inputs from the primary kinetic energy source, the desired energy needs, and the kinetic energy transference device 540.

To control the speed of the output shaft of the kinetic energy transference device, the gate slows itself until the force desired is measured at the gate output shaft 550. The exact amount of force out the gate output shaft is transmitted to the speed and force control module 560. The speed that forces exits equals the input speed minus the speed of the gate and the slower the gate moves, the faster the output shaft and vice versa 570 of one embodiment.

A Lobed Disc

FIG. 6A shows for illustrative purposes only an example of a lobed disc of one embodiment. FIG. 6A shows a lobed disc 600 used in transferring kinetic energy from, for example, a wheel to a planetary gear set of one embodiment.

FIG. 6B shows for illustrative purposes only an example of a lobed disc coupled to a planetary gear set from the gear set prospective of one embodiment. FIG. 6B shows a lobed disc coupled to a planetary gear set from the gear set prospective. The lobed disc 600 connected to the planetary gear system 200 forming a kinetic energy transfer gear set connected to the CVT planetary gear system 110 of FIG. 1. The lobed disc when speed and force are applied to the lobed disc transfers kinetic energy with a rod coupled to the ring gear 210 of the planetary gear set of one embodiment.

FIG. 6C shows for illustrative purposes only an example of a lobed disc coupled to a planetary gear set from the lobed disc prospective of one embodiment. FIG. 6C shows a lobed disc coupled to a planetary gear set from the lobed disc prospective. The lobed disc 600 connected to the planetary gear system 200 forming a kinetic energy transfer gear set connected to the CVT planetary gear system 110 of FIG. 1. A rotating lobed disc transfers the speed and force of its rotation to the ring gear 210. In one instance the speed and force energy transferred to the ring gear 210 is further transferred to the flywheel of one embodiment.

Planetary Gear Set Movement

FIG. 7 shows for illustrative purposes only an example of planetary gear set movement of one embodiment. FIG. 7 shows planetary gear set movement when speed and force of kinetic energy is transferred for a primary energy source. Seen are the different movements when the input is moving. The input in this instance is the primary kinetic source, for example, a gas engine 102 turning in this example in a gas engine clockwise direction 700. The planetary gear system 200 forms a kinetic energy transfer gear set. The primary kinetic source energy is transferred to the sun gear 220 of FIG. 2 which rotates also in a sun gear clockwise direction 710. The sun gear clockwise direction 710 is transferred to each planet gear 240 of FIG. 2 that rotates in a planetary carrier 230 of FIG. 2 counter-clockwise direction 720.

The planetary carrier 230 of FIG. 2 counter-clockwise direction 720 rotates the ring gear 210 of FIG. 2 in a ring gear counter-clockwise direction 730. Each planet gear 240 of FIG. 2 is coupled to the planetary carrier 230 that remains stationary. The CVT kinetic force is input into the sun gear and that force is split between the ring gears. The CVT is the speed governor, and the planetary carrier 230 is the output. The speed/force is minus the speed/force to the ring gear equals the speed/force that exits the carrier shaft 750. All the planet gears 240 of FIG. 2 move the planetary carrier 230 of FIG. 2 and do not enter the equation.

The force/speed can enter through the input/sun gear 220 of FIG. 2 or through the carrier shaft 750 when a car is decelerating. The ring gear controls which direction that force/speed goes, either into the ring gear or to the sun gear. When the CVT is connected to a Flywheel storage device, the energy can either come from it through the sun gear 220 of FIG. 2 or can be input back into it through the same gear. Depending on if the auto is accelerating or decelerating of one embodiment.

Primary Kinetic Source Combustion Engines on Automobiles

Figure 8:
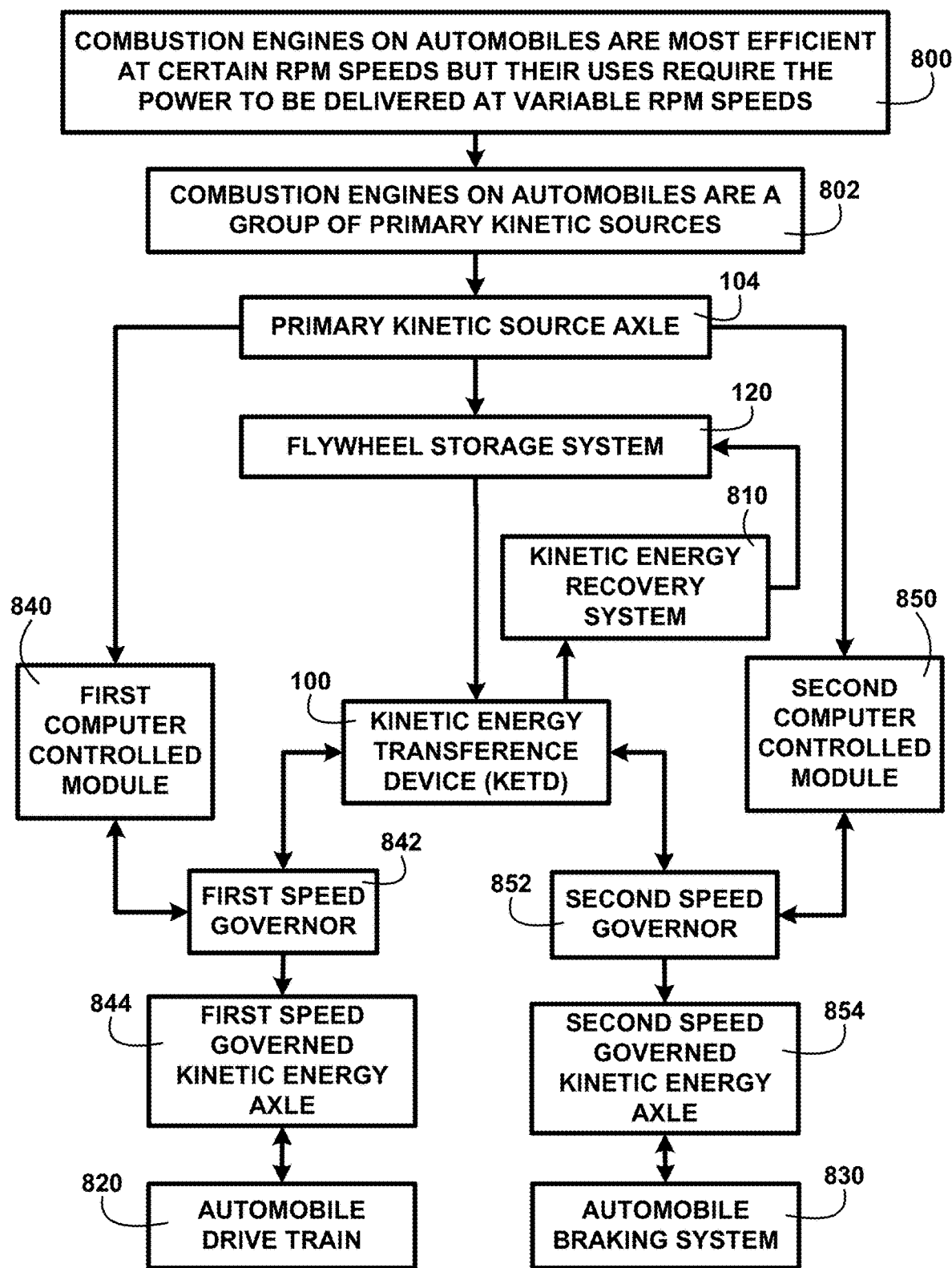
FIG. 8 shows a block diagram of an overview of primary kinetic source combustion engines on automobiles of one embodiment.

FIG. 8 shows a block diagram of an overview of primary kinetic source combustion engines on automobiles of one embodiment. FIG. 8 shows combustion engines on automobiles are most efficient at certain RPM speeds, but their uses require the power to be delivered at variable RPM speeds of 800. In one embodiment, combustion engines on automobiles are a group of primary kinetic sources 802. A primary kinetic source axle 104 is coupled to a flywheel storage system 120. A flywheel is used for a kinetic energy transference device (KETD) 100 in a kinetic energy recovery system 810.

The first computer-controlled module 840 is electronically coupled to a first-speed governor 842. The first-speed governor 842 is coupled to the kinetic energy transference device (KETD) 100 and to a first-speed governed kinetic energy axle 844. The first speed-governed kinetic energy axle 844 is coupled to an automobile drive train 820 and is a mechanism to control the rate of speed of the automobile drive train 820.

A second computer-controlled module 850 is electronically coupled to a second-speed governor 852. The kinetic energy recovery system 810 determines any excess kinetic energy not needed by the automobile drive train 820. The excess kinetic energy determined is passed through to a second speed-governed kinetic energy axle 854 for transference to an automobile braking system 830 of one embodiment.

Primary Kinetic Source Electric Motor/Generator

Figure 9:
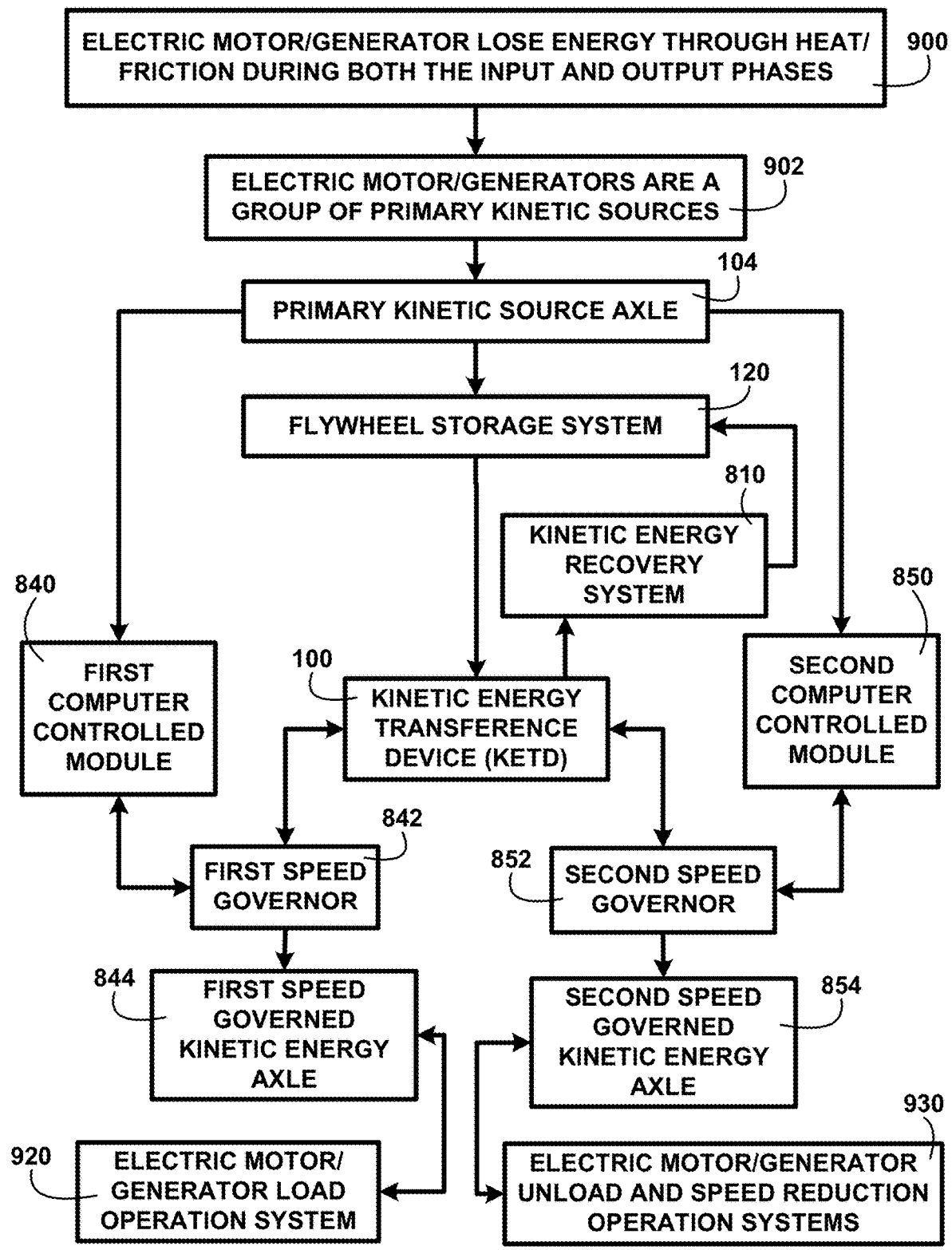
FIG. 9 shows a block diagram of an overview of the primary kinetic source electric motor/generator of one embodiment.

FIG. 9 shows a block diagram of an overview of the primary kinetic source electric motor/generator of one embodiment. FIG. 9 shows electric motor/generator loses energy through heat/friction during both the input and output phases 900. In one embodiment, electric motor/generators are a group of primary kinetic sources 902. A primary kinetic source axle 104 is coupled to a flywheel storage system 120. A flywheel is used for a kinetic energy transference device (KETD) 100 in a kinetic energy recovery system 810.

The first computer-controlled module 840 is electronically coupled to a first-speed governor 842. The first-speed governor 842 is coupled to the kinetic energy transference device (KETD) 100 and to a first-speed governed kinetic energy axle 844. The first speed-governed kinetic energy axle 844 is coupled to an electric motor/generator load operation system 920 and is a mechanism to control the rate of speed of the electric motor/generator load operation system 920.

A second computer-controlled module 850 is electronically coupled to a second-speed governor 852. The kinetic energy recovery system 810 determines any excess kinetic energy not needed by the electric motor/generator load operation system 920. The excess kinetic energy determined is passed through to a second speed-governed kinetic energy axle 854 for transference to an electric motor/generator unload and speed reduction operation systems 930 of one embodiment.

Primary Kinetic Source Devices with Large Starting Energy Demands

Figure 10:
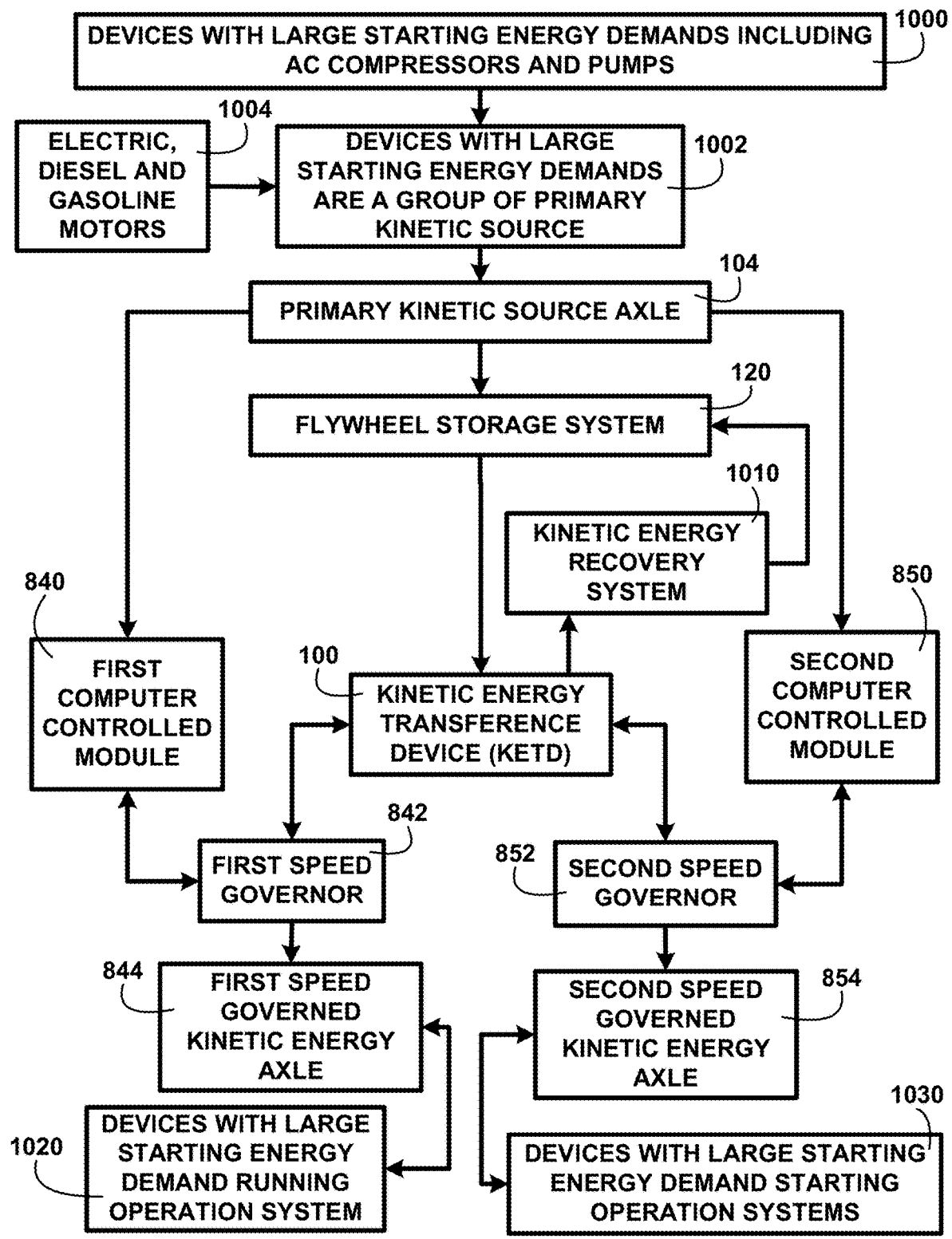
FIG. 10 shows a block diagram of an overview of primary kinetic source devices with large starting energy demands of one embodiment.

FIG. 10 shows a block diagram of an overview of primary kinetic source devices with large starting energy demands of one embodiment. FIG. 10 shows devices with large starting energy demands including ac compressors and pumps 1000 and electric, diesel, and gasoline motors 1004. In one embodiment, devices with large starting energy demands are a group of primary kinetic sources 1002. A primary kinetic source axle 104 is coupled to a flywheel storage system 120. A flywheel is used for a kinetic energy transference device (KETD) 100 in a kinetic energy recovery system 1010.

The first computer-controlled module 840 is electronically coupled to a first-speed governor 842. The first-speed governor 842 is coupled to the kinetic energy transference device (KETD) 100 and to a first-speed governed kinetic energy axle 844. The first speed-governed kinetic energy axle 844 is coupled to devices with large starting energy demand running operation system 1020 and is a mechanism to control the rate of speed of the devices with large starting energy demand running operation system 1020.

A second computer-controlled module 850 is electronically coupled to a second-speed governor 852. The kinetic energy recovery system 1010 determines any excess kinetic energy not needed by the devices with large starting energy demand running operation system 1020. The excess kinetic energy determined is passed through to a second speed-governed kinetic energy axle 854 for transference to devices with large starting energy demand starting operation systems 1030 of one embodiment.

A Primary Kinetic Source

Figure 11:
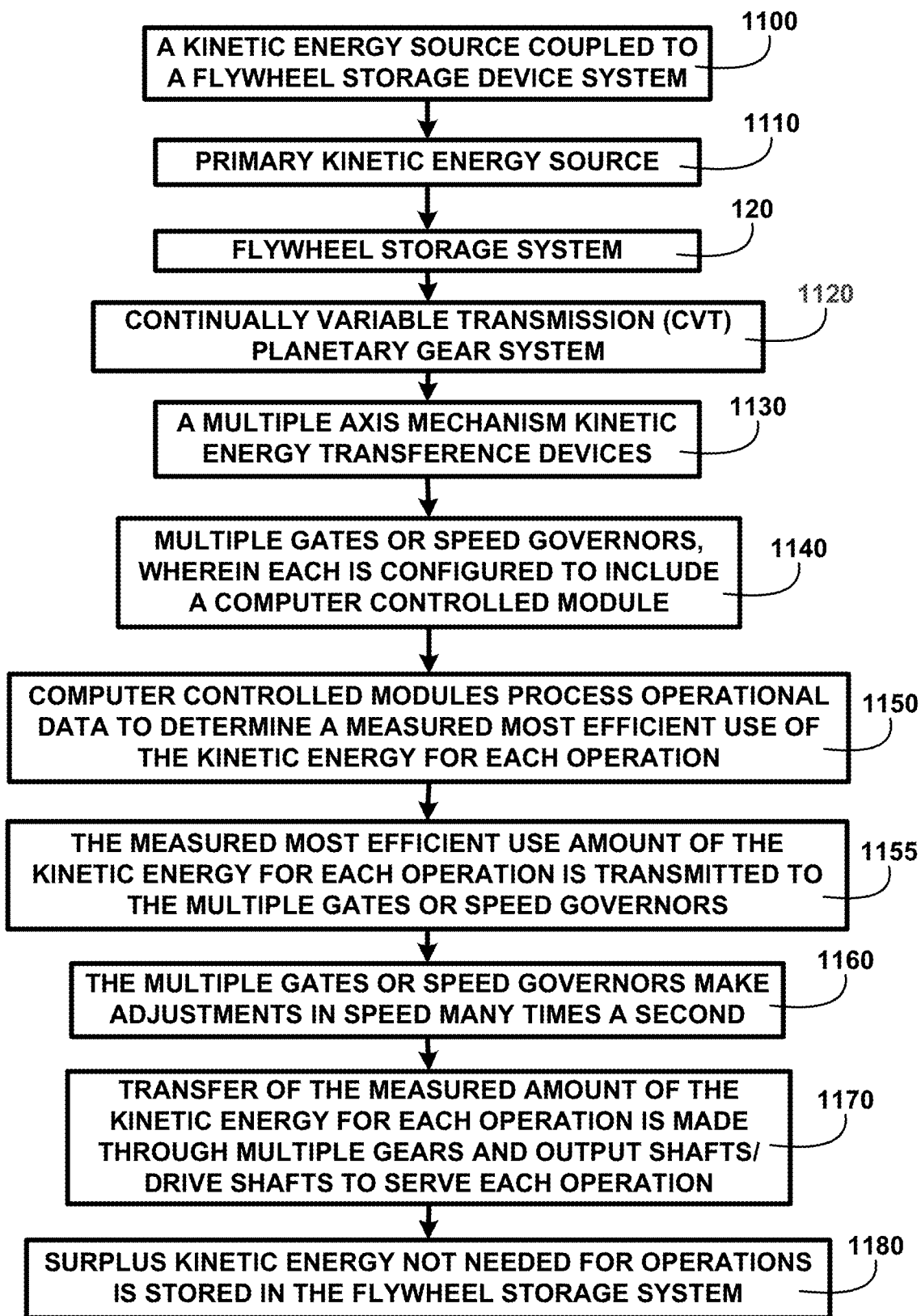
FIG. 11 shows for illustrative purposes only an example of a primary kinetic source of one embodiment.

FIG. 11 shows for illustrative purposes only an example of a primary kinetic source of one embodiment. FIG. 11 shows a kinetic energy source coupled to a flywheel storage device system 1100. The primary kinetic energy source 1110 supplies energy in the form of speed and force that in part may be stored in the flywheel storage system 120. A continually variable transmission (CVT) planetary gear system 1120 is a multiple-axis mechanism kinetic energy transference device 1130. The continually variable transmission (CVT) planetary gear system 1120 includes multiple gates or speed governors, wherein each is configured to include a computer-controlled module 1140.

Computer-controlled modules process operational data to determine a measured most efficient use of the kinetic energy for each operation 1150. The measured most efficient use amount of the kinetic energy for each operation is transmitted to the multiple gates or speed governors 1155. The multiple gates or speed governors make adjustments in speed many times a second 1160. Transfer of the measured amount of the kinetic energy for each operation is made through multiple gears and output shafts/drive shafts to serve each operation 1170. Surplus kinetic energy not needed for operations is stored in the flywheel storage system 1180 of one embodiment.

Transfer Gears

Figure 12:
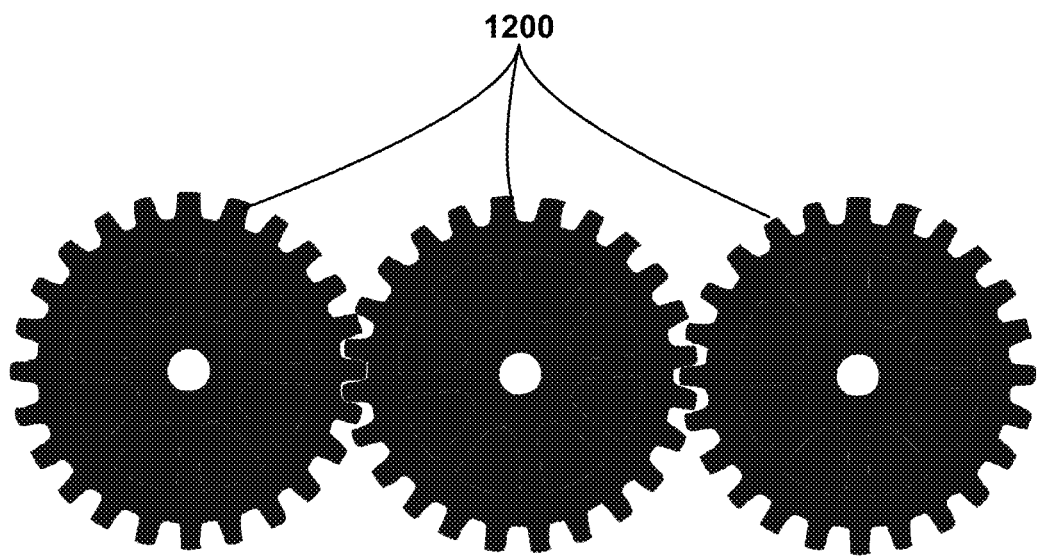
FIG. 12 shows for illustrative purposes only an example of a transfer gears of one embodiment.

FIG. 12 shows for illustrative purposes only an example of a transfer gears of one embodiment. FIG. 12 shows in one embodiment transfer gears 1200 are aligned side to side where in another embodiment the transfer gears are configured in a triangular orientation of one embodiment.

A Hydraulic Actuator 1300 Coupled to a Lobed Disc

Figure 13:
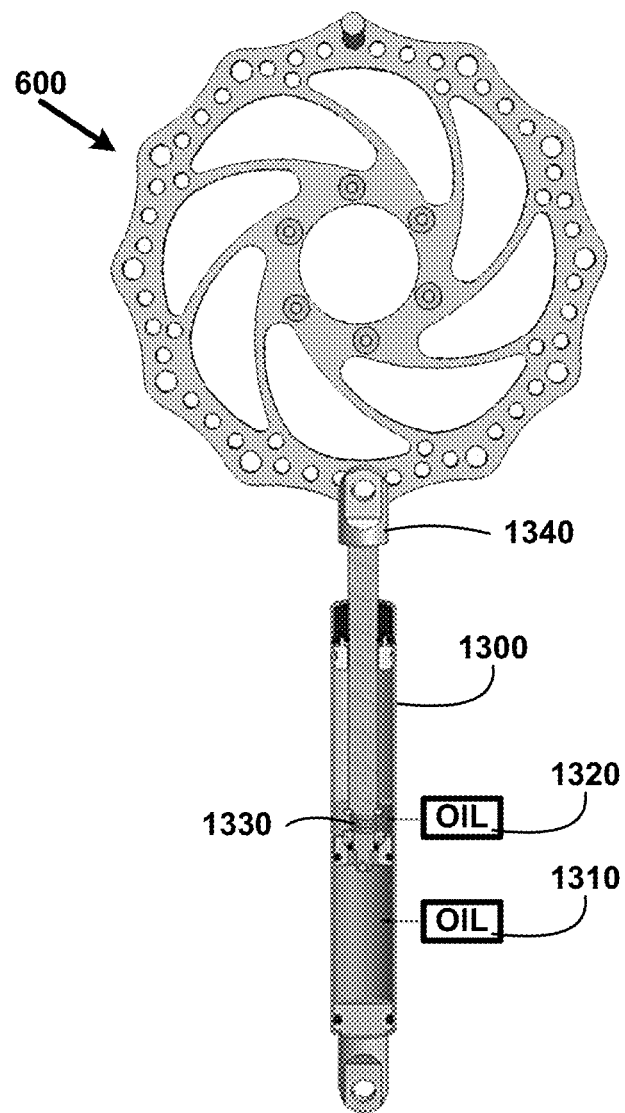
FIG. 13 shows for illustrative purposes only an example of a hydraulic actuator coupled to a lobed disc of one embodiment.

FIG. 13 shows for illustrative purposes only an example of a hydraulic actuator coupled to a lobed disc of one embodiment. FIG. 13 shows a hydraulic actuator 1300 coupled to a lobed disc 600 to transfer kinetic energy. The hydraulic actuator 1300 is also used as a shock absorber in autos. There is a valve 1330 at the end of the rod 1340 inside the chamber which controls the amount of fluid in this instance oil that can pass from beneath the rod 1310 to the area around the rod 1320. By adjusting this valve, the force needed to move the rod up or down becomes easier or harder. To act as a speed governor, this actuator connects to a wheel bearing that rides on the outer edge of the lobed disc 300.

As the disc above rotates, the lobes on the disc cause the actuator to go in and out. By controlling the valve 1330 in the actuator 1300, the force needed for the disc to turn increases or decreases. The greater the force applied to the actuator 1300, the equal amount of force exits the planetary carrier 230 of FIG. 2 of the CVT, and the speed goes with it. This actuator valve can be controlled electronically and adjusted to direct the desired speed or force out the carrier shaft 750 of FIG. 7. The CVT control module takes input from the speed entering the CVT, the force that is being applied, the desired speed and force being called for, and the current speed force exiting the output/carrier shaft 750 of FIG. 7 of one embodiment.

Hybrid Automobile Regenerative Brakes

Figure 14A:
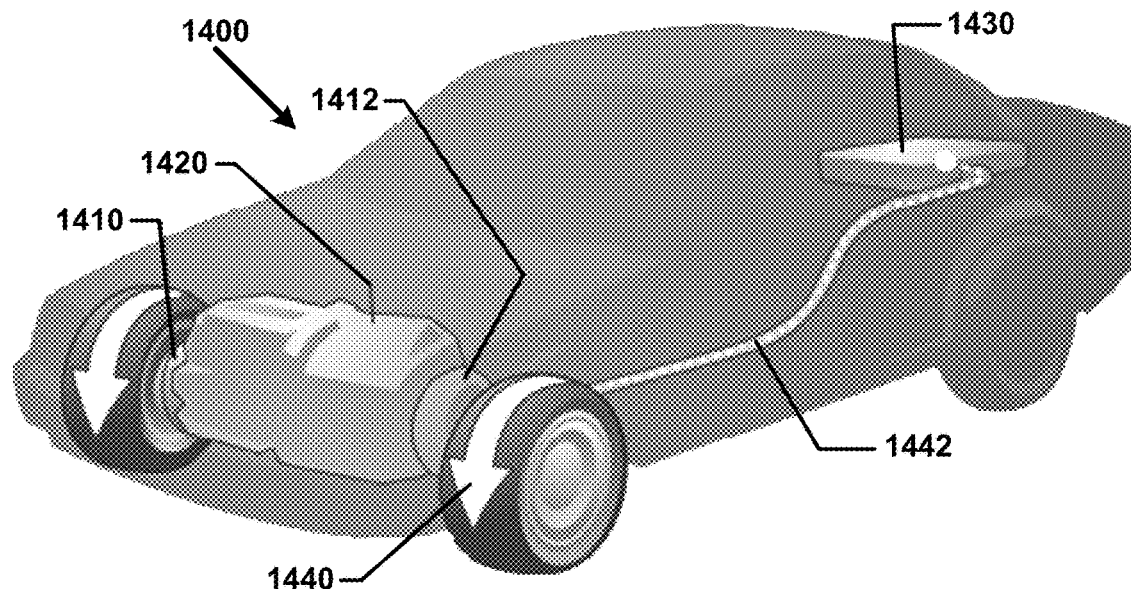
FIG. 14A shows for illustrative purposes only an example of a hybrid automobile regenerative brakes of one embodiment.

FIG. 14A shows for illustrative purposes only an example of a hybrid automobile regenerative brakes of one embodiment. FIG. 14A shows a hybrid automobile with regenerative brakes 1400. A right electric motor 1410 and at times a gasoline engine 1420 and a left electric motor 1412 provide power to the front wheels. Kinetic brake energy 1440 is developed when decelerating or stopping.

The kinetic brake energy 1440 is fed back to the battery 1430. The kinetic energy transference device 100 of FIG. 1 reduces the energy consumed for actual deceleration and stopping and transfers the increased recovered braking energy 1442 to the battery 1430 of one embodiment.

Figure 14B:
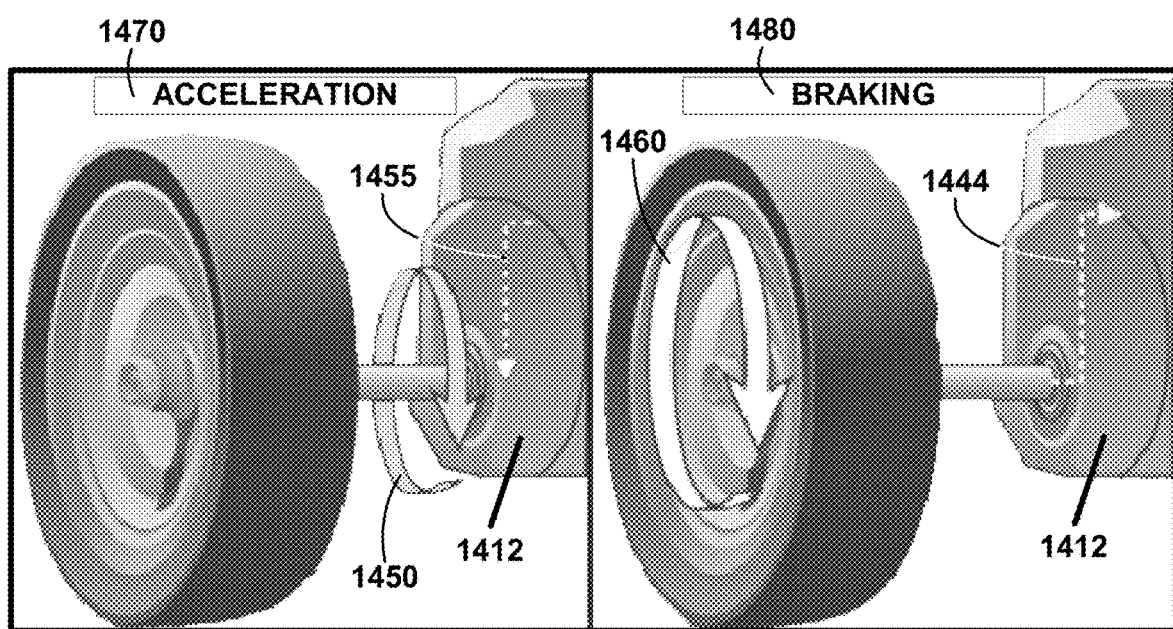
FIG. 14B shows for illustrative purposes only an example of acceleration and braking for hybrid automobile regenerative brakes of one embodiment.

FIG. 14B shows for illustrative purposes only an example of acceleration and braking for hybrid automobile regenerative brakes of one embodiment. FIG. 14B shows in the left panel an example of acceleration 1470. In this example, acceleration 1470 is powered by the left electric motor 1412. Acceleration energy 1450 is supplemented using the stored kinetic energy from the kinetic energy transference device 100 of FIG. 1 thereby reducing the acceleration energy from the left electric motor 1455 of one embodiment.

The right panel shows braking 1480 wherein energy from the left electric motor 1412 is conserved in part and kinetic brake energy 1460 is generated. The kinetic energy transference device 100 of FIG. 1 provides a portion of the braking energy needed reducing the energy needed to decelerate and increasing the recovered braking energy that is transferred 1444 to the battery 1430 of one embodiment.

Acceleration Kinetic Energy Flow

Figure 15A:
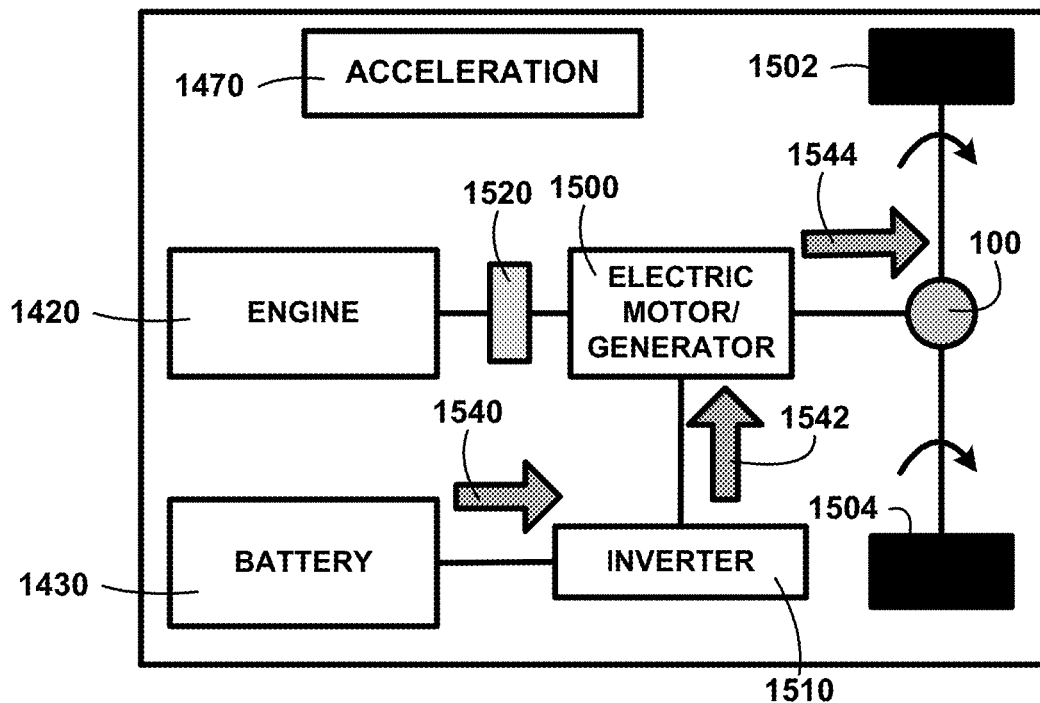
FIG. 15A shows for illustrative purposes only an example of the acceleration kinetic energy flow of one embodiment.

FIG. 15A shows for illustrative purposes only an example of the acceleration kinetic energy flow of one embodiment. FIG. 15A shows how kinetic energy flows, for example, in an automobile during acceleration 1470. Kinetic energy from an engine 1420 is transferred to a clutch 1520 to an electric motor/generator 1500. Additional energy is transferred 1540 from a battery 1430 to an inverter 1510 and transferred 1542 to the electric motor/generator 1500. The combined energy is transferred 1544 to the kinetic energy transference device 100 and split a left drive wheel 1502 and a right drive wheel 1504 of one embodiment.

Braking Kinetic Energy Flow

Figure 15B:
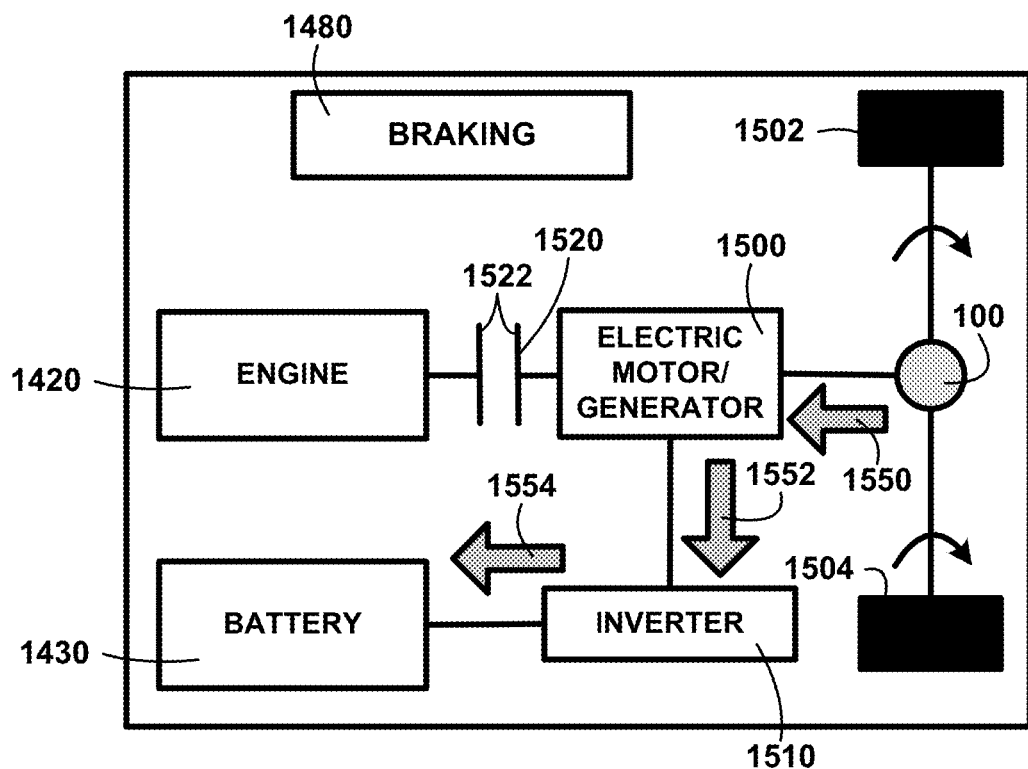
FIG. 15B shows for illustrative purposes only an example of the braking kinetic energy flow of one embodiment.

FIG. 15B shows for illustrative purposes only an example of the braking kinetic energy flow of one embodiment. FIG. 15B shows how kinetic energy flows, for example, in an automobile during braking 1480. Kinetic energy from an engine 1420 is not transferred 1522 through the clutch 1520 to an electric motor/generator 1500. The kinetic energy generated is transferred 1550 from the left wheel 1502 and right wheel 1504 through the kinetic energy transference device 100. The braking energy generated is converted to electricity in the electric motor/generator 1500. The converted electricity is transferred from 1552 to the inverter 1510. The inverter 1510 regulates the characteristics of the electrical energy and transfers 1554 to the battery 1430 of one embodiment.

The CVT can recover as much energy as it can deliver as that limit is set by the gate or speed governor 500 of FIG. 5 and it does not matter in which direction the energy is flowing. In and out requires the same mechanics so for the same cost to be able to recover 1500 horsepower, the CVT can also supply that much power. If the specifications are for the CVT to be able to recover 1500 horsepower, then it can deliver that much too, and for no additional costs. If the flywheel and CVT can handle 1500 HP input, it can also deliver that much power if desired and for no additional cost.

Additional Applications and Features

Figure 16:
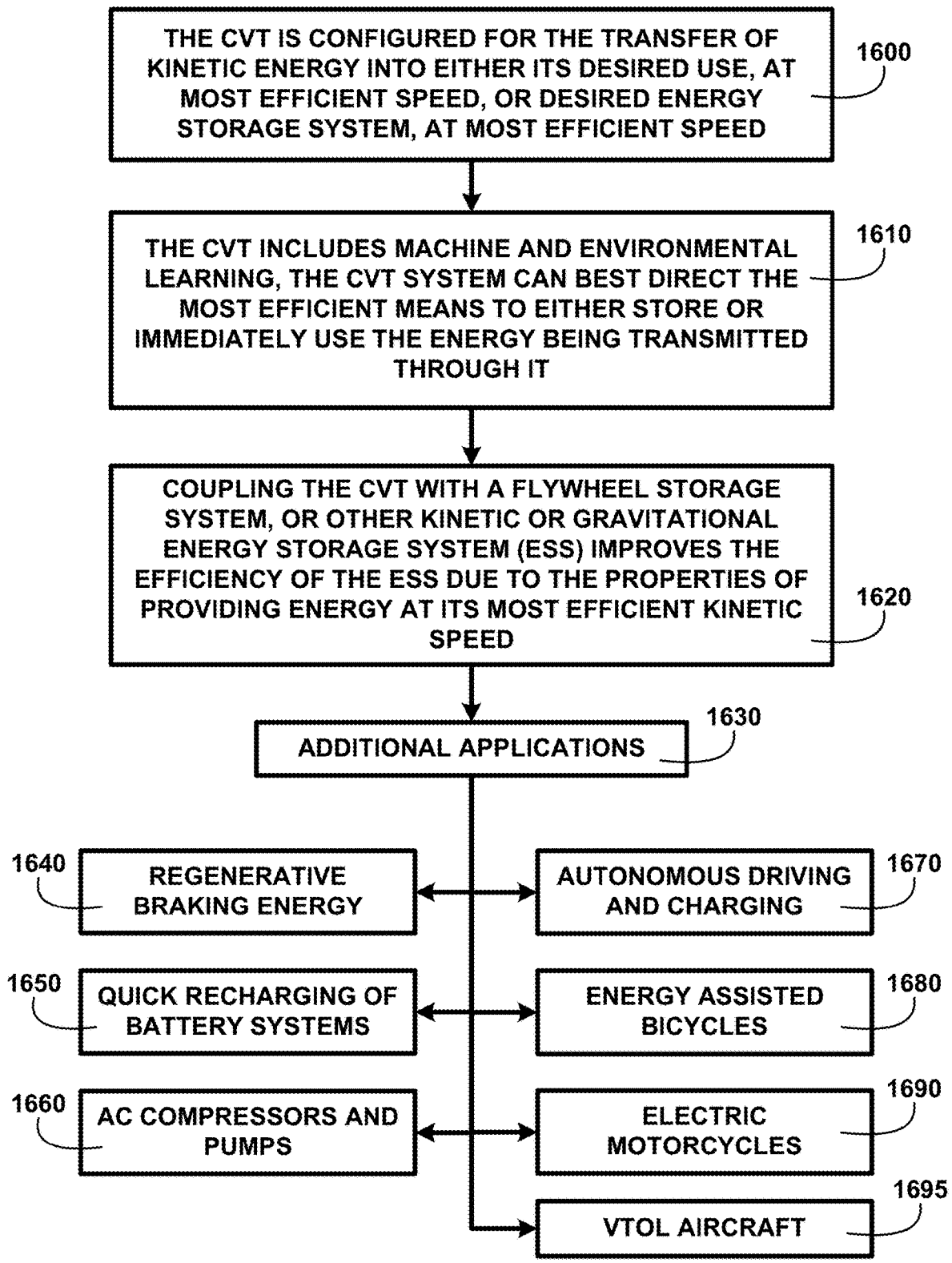
FIG. 16 shows a block diagram of an overview of additional applications and features of one embodiment.

FIG. 16 shows a block diagram of an overview of additional applications and features of one embodiment. FIG. 16 shows additional applications and features of the kinetic energy transference device 100 of FIG. 1. The CVT is configured for the transfer of kinetic energy into either it's desired use, at the most efficient speed, or desired energy storage system, at the most efficient speed 1600.

The CVT includes machine and environmental learning, the CVT system can best direct the most efficient means to either store or immediately use the energy being transmitted through it 1610. Coupling the CVT with a flywheel storage system, or another kinetic or gravitational energy storage system (ESS) improves the efficiency of the ESS due to the properties of providing energy at its most efficient kinetic speed 1620.

The kinetic energy transference device 100 of FIG. 1 has additional applications 1630 other than automobiles. As described regenerative braking energy 1640 of vehicles and equipment that starts and stops recover energy that can reduce starting energy with the stored energy being applied to starting motors to reduce costs, wear and tear of motors, and save time by shorting the start-up period.

Quick recharging of battery systems 1650 is achieved by applying the stored energy in the recharging system on top of the other energy sources. Reducing start-up time with stored energy augmenting normal power consumption also reduces stress on motors of AC compressors and pumps 1660.

Autonomous driving and charging 1670 is improved by reducing energy consumption and applying stored and recovered energy to extend driving time and distance. An autonomous auto can drive itself to the nearest most efficient charging station at times, not desirable for most humans. Using the CVT and its learning systems, the auto can locate, calculate and arrive at the most efficient location to recharge its energy storage systems. At the charging station, the CVT system can determine and direct the energy into the most efficient storage system.

Riders of energy-assisted bicycles 1680 do not need to work as hard as the kinetic energy transference device 100 of FIG. 1 will apply stored and recovered energy to add non-rider exerted effort to power the energy-assisted bicycles 1680. Most energy-assisted bicycles use electric motors and chemical batteries to assist. These systems are charged at home and also recover energy during their use. Instead of using electric motors and batteries, they can employ the CVT with flywheel storage. Keeping kinetic energy in its form is more efficient than transferring it to and from chemical storage systems. A CVT bicycle system can provide greater range and less weight than other battery/electric systems. Additionally, a CVT with a flywheel bicycle system can convert energy from its rider, through a crank system, to continually collect energy at the desired rate but deliver energy as needed such as the increase in the amount of energy needed for steep inclines.

The same is true for electric motorcycles 1690 with reducing energy consumption and applying stored and recovered energy to extend driving time and distance. Because the CVT can very efficiently transmit kinetic energy, systems using weights can be more efficient when employing the CVT to transmit the kinetic energy from the gravitational pull to the electrical generator. The same works in reverse for converting electricity to lift the weight again. In systems like windmills and hydro plants, keeping the energy in kinetic form is more efficient. Utilizing the CVT will increase the net amount of energy from a system by decreasing the amount of loss of energy during the charging and discharging phases. With machine learning, utilizing the CVT to direct where to store the energy will also increase the system's net efficiency.

The main use of energy for VTOL aircraft 1695 and most aircraft is to get the craft airborne. Current flywheel technology allows more energy density than batteries so using flywheels, coupled with the CVT, can provide better efficiency for the new wave of VTOL and electric aircraft. The high demands of energy for lifting an aircraft into flight mode can be better handled by drawing that energy from flywheels rather than batteries. This will lessen the weight needed if that energy had to come from batteries. Most current aircraft designs do not recover energy in the slowing down and landing portions of their flight. With the CVT, prior to landing, the craft can recover energy during the slow down and descent phases of the flight and store that energy in the flywheels to use again during the vertical landing phases. During traditional flights, during the slow down and descent portion of the flight, the aircraft bleeds off speed gradually. This means the energy is being consumed by friction and not recovered. Our CVT will shorten this phase and recover the energy to use during the final landing phase. This will decrease the total flight time and allow passengers to reach their destination quicker and with less total energy needed of one embodiment.

Multiple Axis Mechanism

Figure 17:
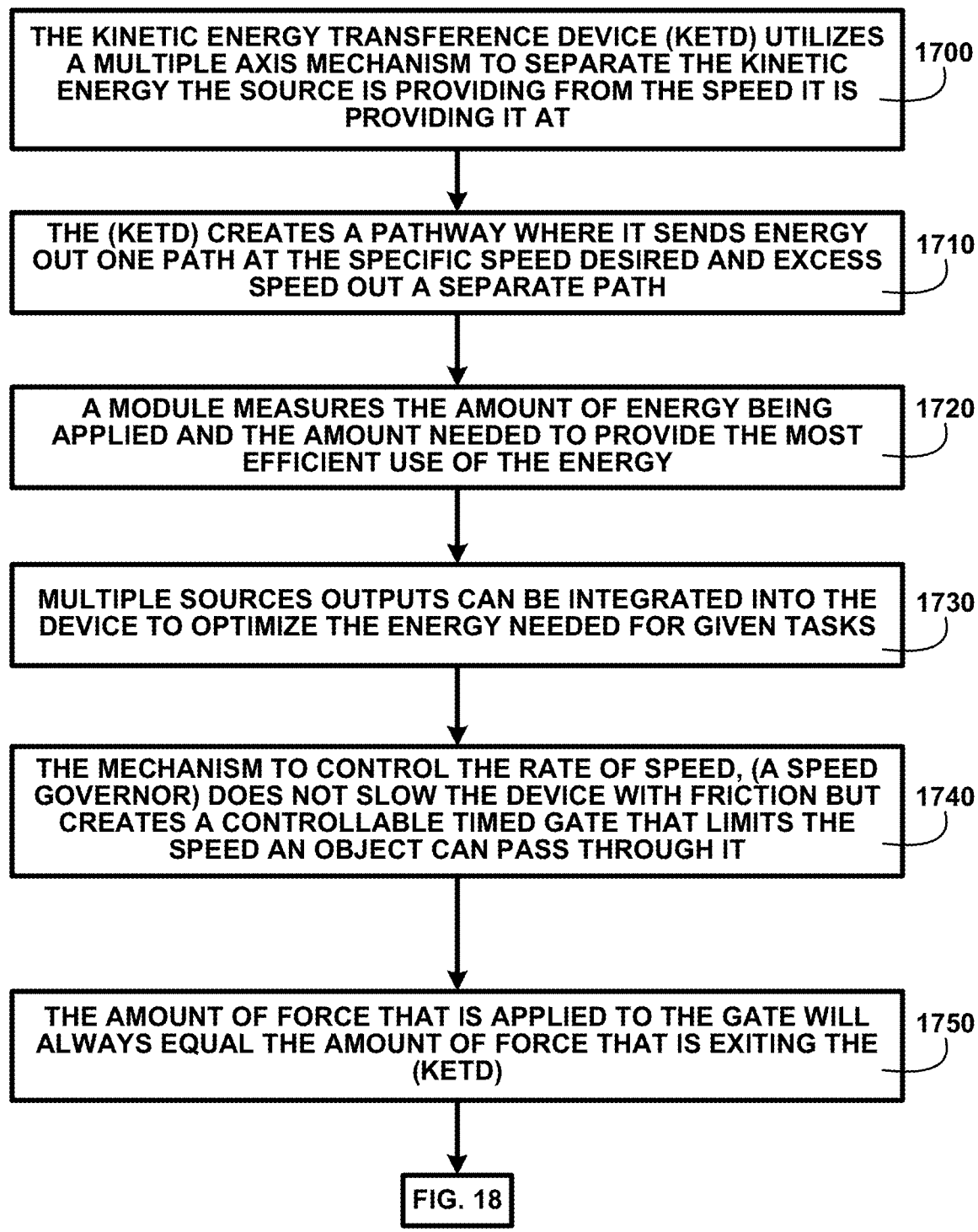
FIG. 17 shows a block diagram of an overview of a multiple-axis mechanism of one embodiment.

FIG. 17 shows a block diagram of an overview of a multiple-axis mechanism of one embodiment. FIG. 17 shows the kinetic energy transference device (KETD) utilizes a multiple-axis mechanism to separate the kinetic energy the source is providing from the speed it is providing it at 1700. The (KETD) creates a pathway where it sends energy out of one path at the specific speed desired and excess speed out to a separate path 1710. A module measures the amount of energy being applied and the amount needed to provide the most efficient use of the energy 1720. Multiple sources of outputs can be integrated into the device to optimize the energy needed for given tasks 1730. The mechanism to control the rate of speed, (a speed governor) does not slow the device with friction but creates a controllable timed gate that limits the speed an object can pass through it 1740. The amount of force that is applied to the gate will always equal the amount of force that is exiting the (KETD) 1750 of one embodiment. The descriptions continue in FIG. 18.

KETD Features

FIG. 18 shows a block diagram of an overview of the KETD features of one embodiment. FIG. 18 shows a continuation from FIG. 17 with the speed the gate operates at is adjustable via a computer-controlled module that takes inputs from the source, the desired need, and the (KETD) itself 1800. To control the speed of the output shaft of the (KETD), the gate slows itself until the force desired is measured at the gate which in turn will send that exact amount of force out of the output shaft 1810. The speed that forces exits equals the input speed minus the speed of the gate 1820. The slower the gate moves, the faster the output shaft and vice versa 1830. The computerized speed control module measures force and not just speed 1840. Measuring force in addition to speed allows the source to provide energy in the most efficient means 1850. In instances where energy is desired to be recovered, the module controls the gate speed and force to transfer energy from the output shaft back to the source 1860. The module calculates the desired values and makes adjustments many times a second to provide the most efficient use of energy from the source 1870 of one embodiment.

It should be noted that the descriptions that follow, for example, in terms of a transmission platform method and devices is described for illustrative purposes and the underlying system can apply to any number and multiple types of combustion engines and electric motors. In one embodiment of the present invention, the transmission platform method and devices can be configured using an electronic control box. The transmission platform method and devices can be configured to include a planetary gear and can be configured to include a speed governor using the present invention.

Transmission Platform

Figure 19:
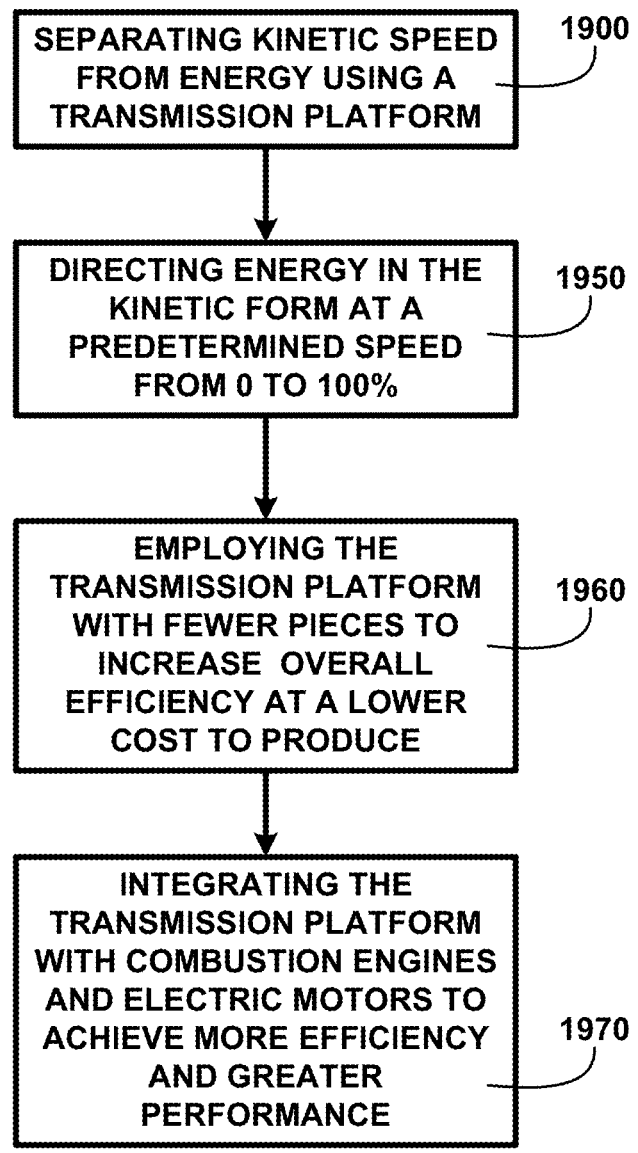
FIG. 19 shows a block diagram of an overview flow chart of a transmission platform of one embodiment.

FIG. 19 shows a block diagram of an overview flow chart of a transmission platform of one embodiment. FIG. 19 shows separating kinetic speed from energy using a transmission platform 1900. The transmission platform 1900 is used for directing energy in the kinetic form at a predetermined speed from 0 to 100% 1950. Power systems increase efficiency by employing the transmission platform with fewer pieces to increase overall efficiency at a lower cost to produce 1960. The transmission platform 1900 is adaptable for integrating the transmission platform with combustion engines and electric motors to achieve more efficiency and greater performance 1970.

The transmission platform 1900 does not need friction to adjust ratios and can deliver the best efficiency of combustion engines or electrical motors at any desired speed. The transmission platform 1900 separates kinetic speed from energy and can direct energy in the kinetic form at any desired speed from 0 to 100%. The transmission platform 1900 is smaller, lighter, and with fewer pieces which translates to an even greater overall efficiency as well as a much lower cost to produce. Employing this technology also leads to other integrations that can provide more efficiency and greater performance of one embodiment.

Energy Input

Figure 20:
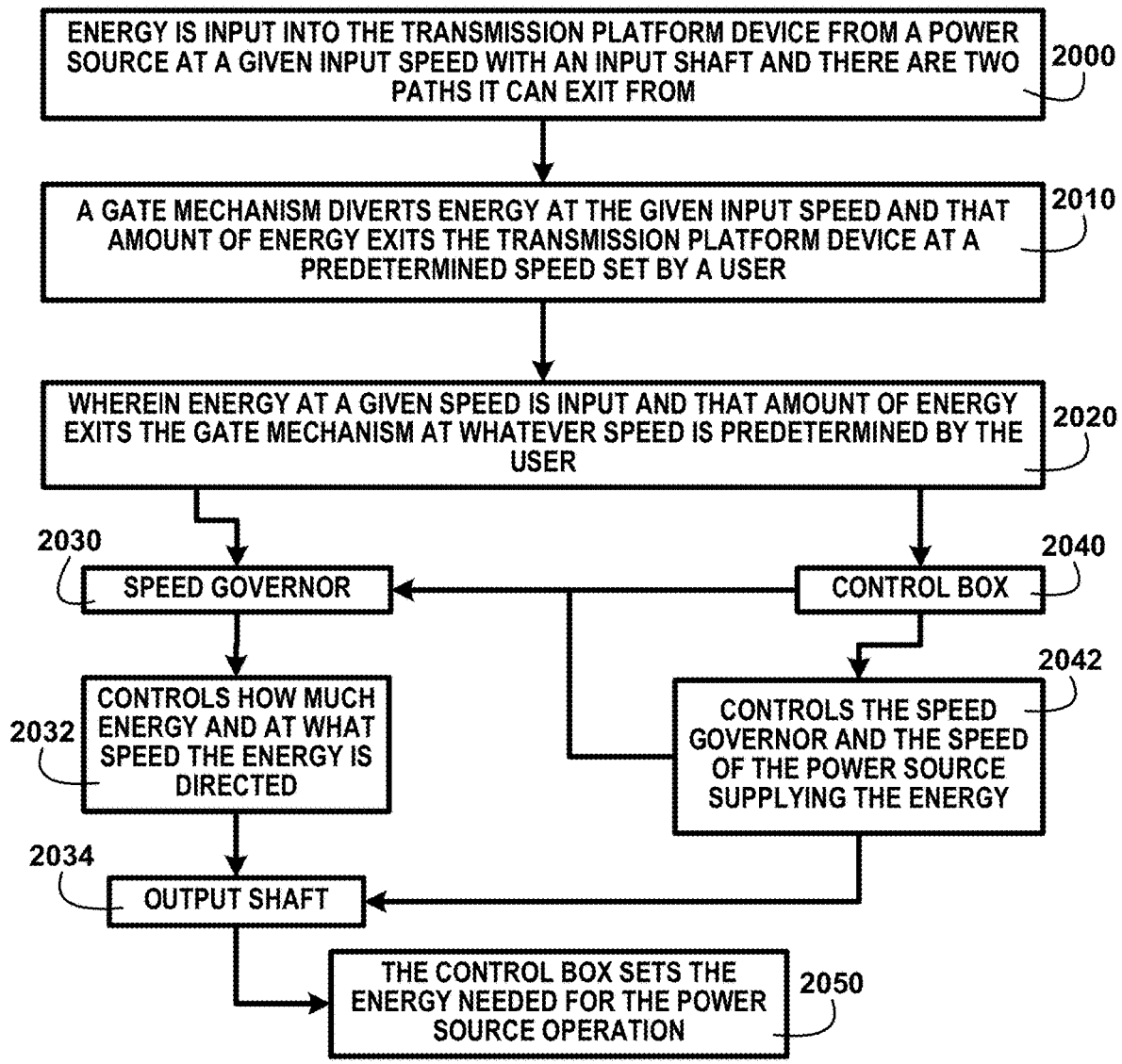
FIG. 20 shows a block diagram of an overview of the energy input of one embodiment.

FIG. 20 shows a block diagram of an overview of the energy input of one embodiment. FIG. 20 shows energy is input into the transmission platform device from a power source at a given input speed with an input shaft and there are two paths it can exit from 2000. A gate mechanism diverts energy at the given input speed and that amount of energy exits the transmission platform device at a predetermined speed set by a user 2010. Wherein energy at a given speed is input and that amount of energy exits the gate mechanism at whatever speed is predetermined by the user 2020. A speed governor 2030 controls how much energy and at what speed the energy is directed 2032 to an output shaft 2034.

A control box 2040 controls the speed governor and the speed of the power source supplying the energy 2042. The control box 2040 regulated speed is conveyed through the output shaft 2034. The control box sets the energy needed for the power source operation 2050 of one embodiment.

Transmission Platform Three Components

Figure 21:
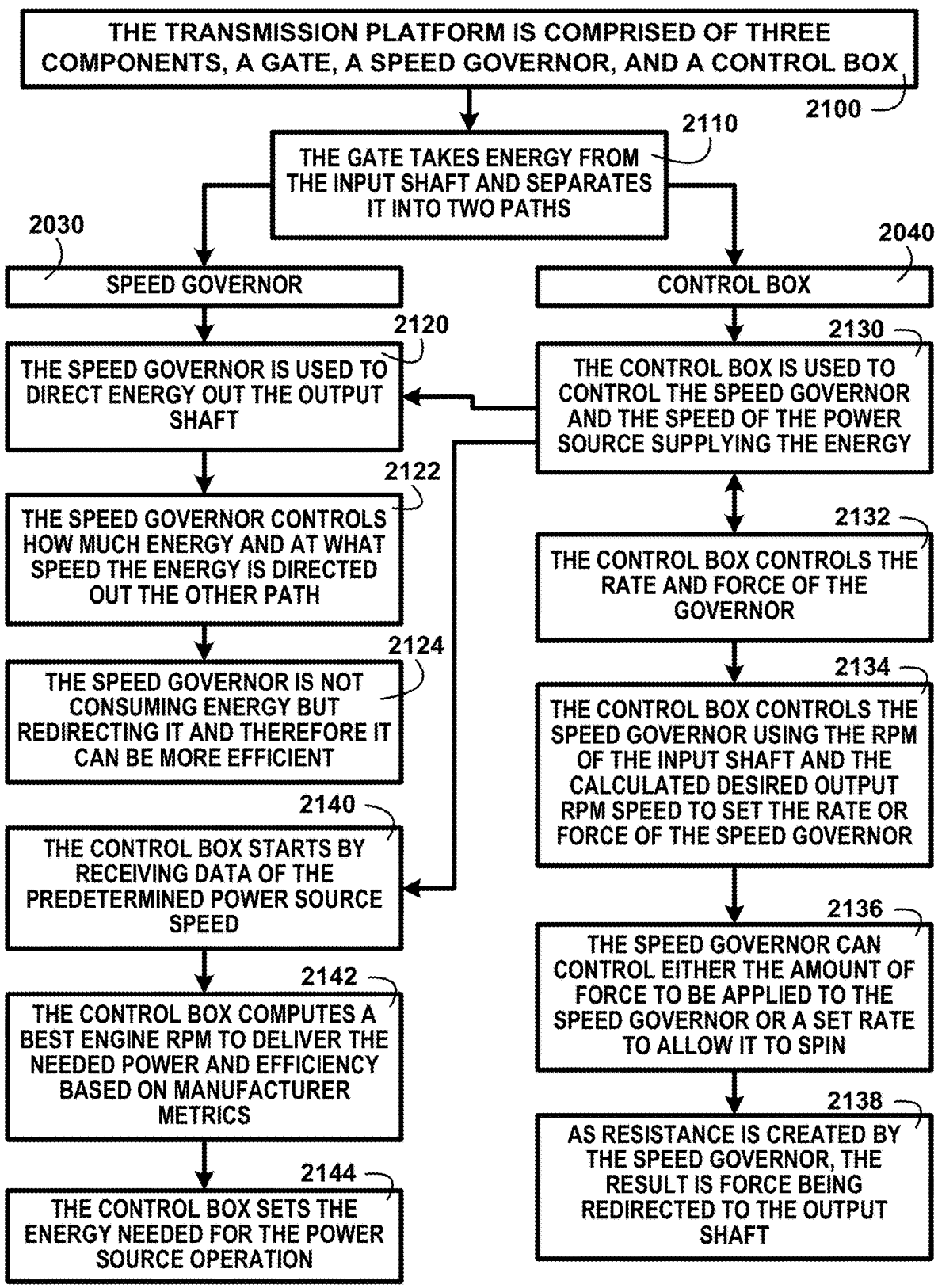
FIG. 21 shows a block diagram of an overview of the transmission platform's three components of one embodiment.

FIG. 21 shows a block diagram of an overview of the transmission platform's three components of one embodiment. FIG. 21 shows the transmission platform is comprised of three components, a gate, a speed governor, and a control box 2100. The gate takes energy from the input shaft and separates it into two paths 2110. Another component is the speed governor 2030. The speed governor is used to direct energy out of the output shaft 2120. The speed governor controls how much energy and at what speed the energy is directed out the other path 2122. The speed governor is not consuming energy but redirecting it and therefore it can be more efficient 2124.

The control box 2040 is a computer that includes processors, memory devices, and communication devices including wired and wireless devices. The control box is used to control the speed governor and the speed of the power source supplying the energy 2130. The control box controls the rate and force of the governor 2132. The control box controls the speed governor using the RPM of the input shaft and the calculated desired output RPM speed to set the rate or force of the speed governor 2134.

The speed governor can control either the amount of force to be applied to the speed governor or a set rate to allow it to spin 2136. As resistance is created by the speed governor, the result is force being redirected to the output shaft 2138. The control box starts by receiving data of the predetermined power source speed 2140. The control box computes the best engine RPM to deliver the needed power and efficiency based on manufacturer metrics 2142 downloaded and stored in the memory devices. The control box sets the energy needed for the power source operation 2144 of one embodiment.

Transmission Platform Prospective Side View

Figure 22:
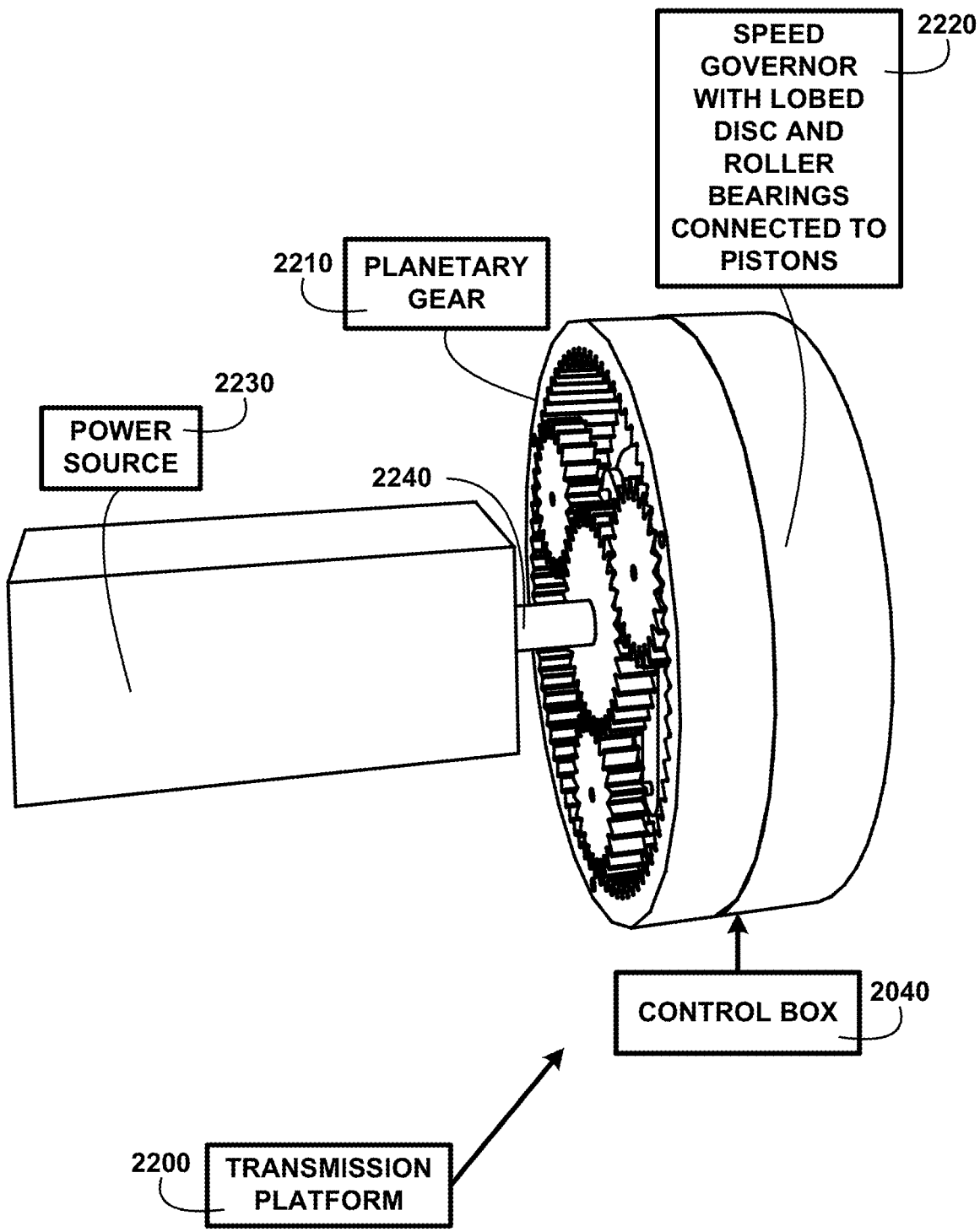
FIG. 22 shows for illustrative purposes only an example of a transmission platform prospective side view of one embodiment.

FIG. 22 shows for illustrative purposes only an example of a transmission platform prospective side view of one embodiment. FIG. 22 shows a side view of the transmission platform 2200. The transmission platform 2200 includes a planetary gear 2210 which is the gate mechanism that takes energy from the input shaft and separates it into two paths. One path is to the ring gear of the speed governor with lobed disc and roller bearings connected to pistons 2220. The other path is to the carrier gear of the planetary gear 2210. The control box 2040 communicates to the speed governor to convert the kinetic energy input into a predetermined speed for the power source 2230 and the output speed of a predetermined speed for the operations receiving devices of the power source 2230 energy. The two paths include one connected to the speed governor that controls how much energy and at what speed the energy is directed out the other path to the operations receiving devices of one embodiment.

Transmission Platform Prospective Power Source End View

Figure 23:
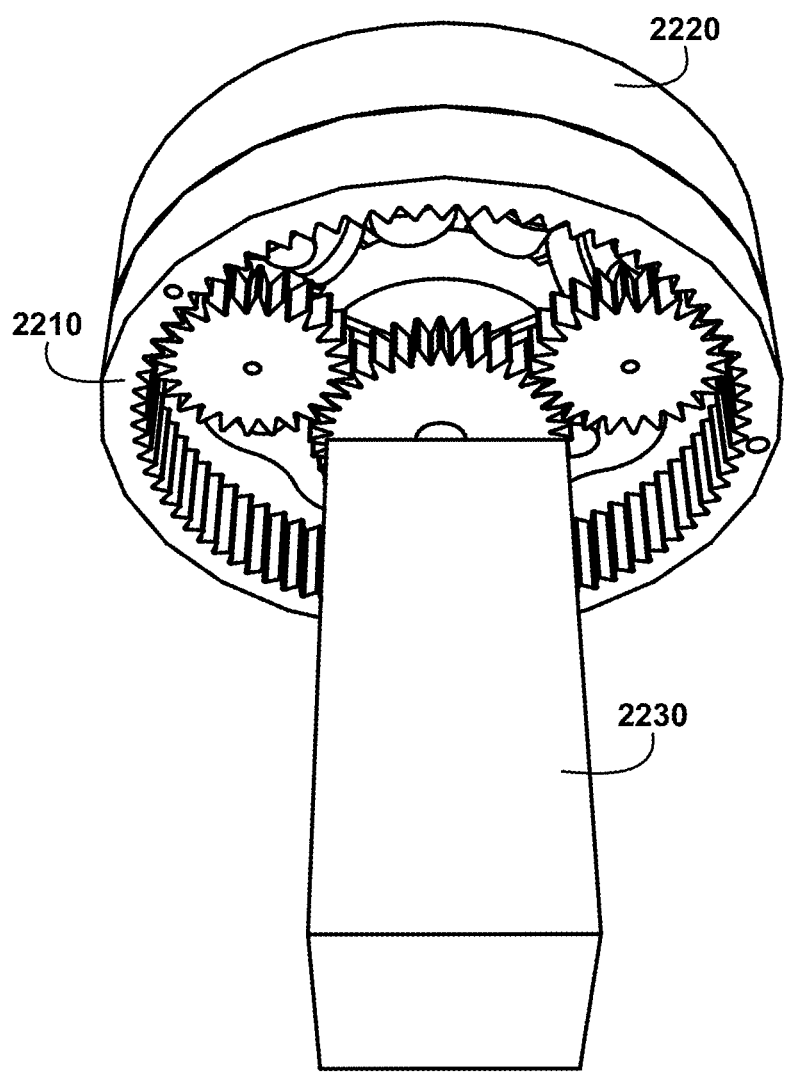
FIG. 23 shows for illustrative purposes only an example of a transmission platform prospective power source end view of one embodiment.

FIG. 23 shows for illustrative purposes only an example of a transmission platform prospective power source end view of one embodiment. FIG. 23 shows the transmission platform 2200 of FIG. 22 from a power source prospective. The planetary gear 2210 connected to the speed governor with lobed disc and roller bearings connected to pistons 2220 is fed energy from the power source 2230 through an input shaft. The control box 2040 of FIG. 20 is not shown. In one embodiment the control box 2040 of FIG. 20 can be integrated into the speed governor of one embodiment.

Transmission Platform Prospective Speed Governor End View

Figure 24:
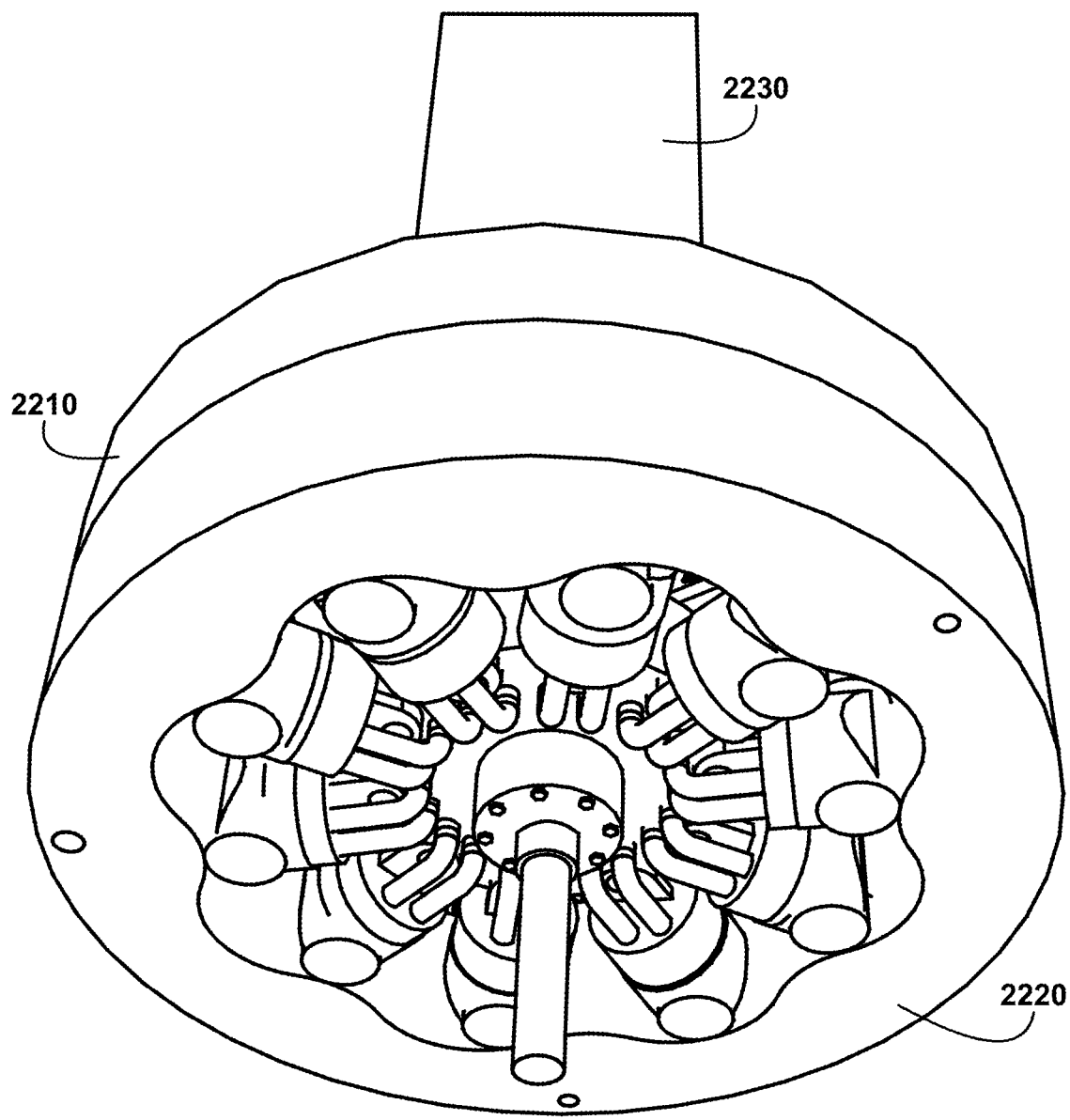
FIG. 24 shows for illustrative purposes only an example of a transmission platform prospective speed governor end view of one embodiment.

FIG. 24 shows for illustrative purposes only an example of a transmission platform prospective speed governor end view of one embodiment. FIG. 24 shows the power source 2230, planetary gear 2210, and speed governor with lobed disc and roller bearings connected to pistons 2220 assemblages in a view from the speed governor end. The components are interconnected with the control box 2040 of FIG. 20 to form the transmission platform 1900 of FIG. 19 of one embodiment.

Speed Governor

Figure 25:
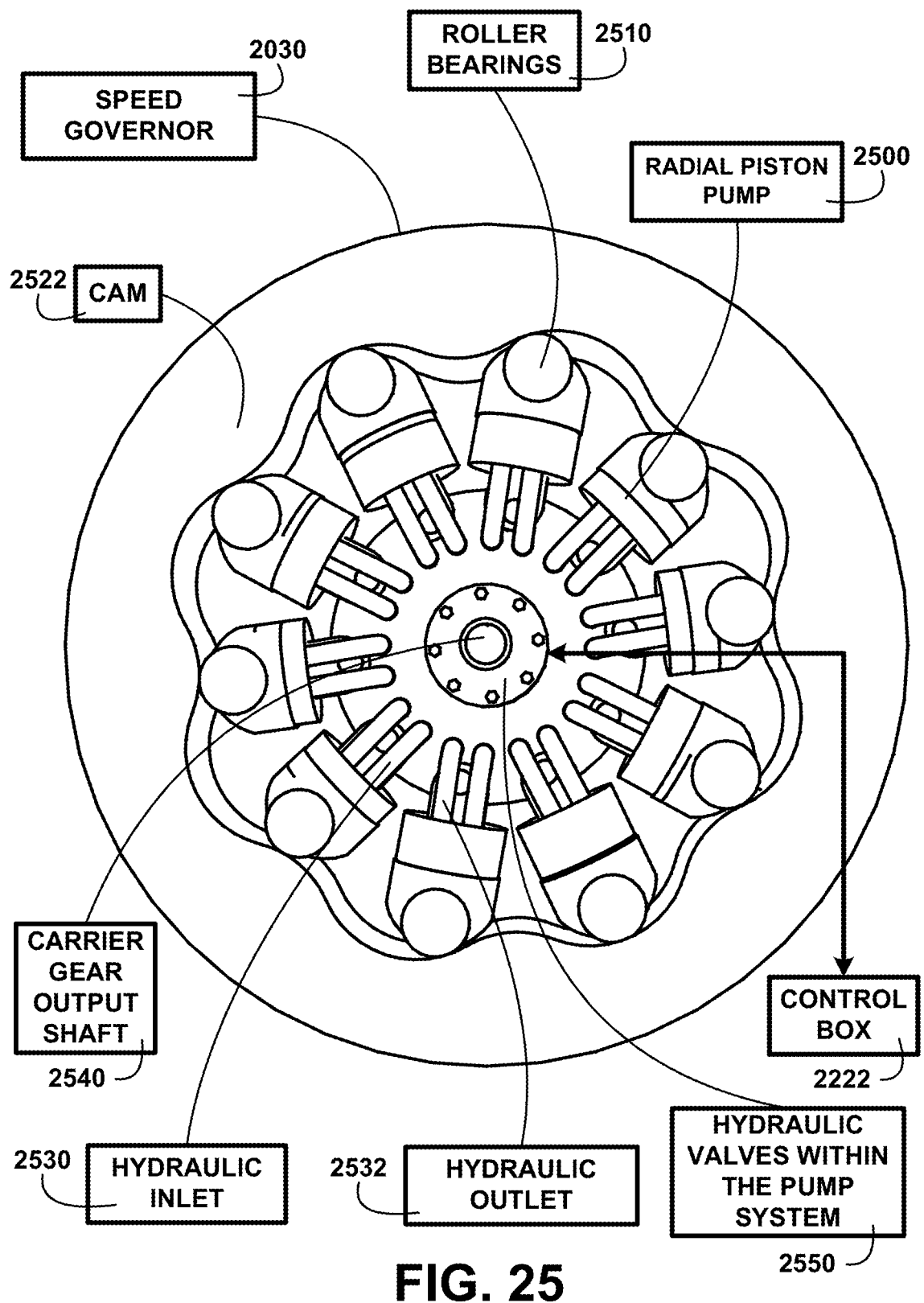
FIG. 25 shows for illustrative purposes only an example of a speed governor of one embodiment 5.

FIG. 25 shows for illustrative purposes only an example of a speed governor of one embodiment. FIG. 25 shows a plurality of a radial piston pump 2500 and roller bearing 2510 components of the speed governor 2030. The roller bearing 2510 components are moved by the rotating lobed disc cam 2522. Hydraulic fluid flows through a hydraulic inlet 2530 into the radial piston pump 2500 as the pump is extended. Hydraulic fluid is pressurized when the radial piston pump 2500 is pushed in by the rotating lobed disc cam 2522 and flows out the hydraulic outlet 2532. Hydraulic valves within the pump system 2550 are controlled by the control box 2222 to regulate the pressure of the hydraulic fluid which regulates the speed of the energy output. The carrier gear output shaft 2540 passes through the speed governor 2030.

The speed governor 2030 uses a hydraulic motor or pump system illustrated with a radial piston pump and controls speed by controlling hydraulic valves within the pump. The governor is not consuming energy but redirecting it and therefore it can be more efficient.

The control box 2222 controls the rate and force of the speed governor 2030 as well as the speed and power of the motor or engine supplying power. The control box 2222 uses the predetermined speed and computes the engine RPM to deliver the needed power based on metrics downloaded from the manufacturer. The control box 2222 sets the speed of the engine or energy needed for the motor.

The second process the control box 2222 does is control the speed governor 2030. This process uses the RPM of the input shaft and the calculated desired output rpm speed to set the rate or force of the speed governor 2030. The speed governor 2030 can control either the amount of force to be applied to the speed governor 2030 or a set rate to allow it to spin. As resistance is created by the speed governor 2030, the result is force being redirected to the output shaft. This amount can be anywhere from 0 to 100% and eliminates the need for clutches or torque converters.

The radial piston pump is the speed governor 2030 and is connected to one of the shafts in the gate. As the shaft connected to the pump spins, resistance can be applied by controlling the fluid valves in the piston pump. By controlling the speed at which fluid can move from the cylinders in the pump, the resistance creates a pace at which energy is being diverted from one shaft of the gate to the other (output) shaft of the gate. This device is controlled by the control box 2222 computer module and can be set to speed or force to be diverted.

To control speed, the module sets the timing for which the hydraulic valves open and what pace they open and close. The speed governor 2030 can direct force by controlling how much pressure the piston will be exerting. Following the laws of physics, every action has an equal and opposite reaction. In situations, like in tractor trailers, where significant energy can be directed to the wheels but when one of the wheels slips, the resistance greatly decreases until the wheel regains traction. If this happens quickly, the change in force and resistance gets absorbed into the drivetrain which can result in a broken axle or another part of the system.

With the transmission platform, if a wheel is spinning and catches traction, the shock is absorbed into the speed governor 2030 by pushing past the hydraulic resistance and allowing the shaft to spin instead of the output shaft or the engine. With traditional gear-to-gear systems, this shock of energy can lead to broken parts. With the transmission platform, these shocks are easily absorbed with no broken parts or even lapses in power delivery.

In order to deliver the output at continually variable speeds, a computer module is needed to make continual adjustments. In the transmission platform, the control module accepts inputs from the driver, from the motor or engine, from the input and output shaft as well as aspects of the speed governor 2030 such as hydraulic pressure.

The transmission platform is a Continually Variable Transmission (CVT) that uses a computer module that can manage different uses to provide the most power, most efficiency, or any combination desired. It can also be set to deliver a set amount of energy (power) and the speed will continually adjust. Instead of the accelerator pedal of an auto being connected to the motor, with the transmission platform, the accelerator is connected to the computer module and it delivers the needed inputs to the different devices.

The computer module can also be used to protect the equipment or deliver the best performance. In an example where a wheel is spinning and loses traction, the computer can reduce the power setting and deliver just enough to regain traction and prevent a sudden grip to send a shock through the drive train. This module can also be used when multiple transmission platforms are used in the same vehicle similar to how EVs operate with multiple motors. There can be a separate transmission platform and module for each wheel with all of the modules connected and interacting with each other to deliver the best performance or efficiency of one embodiment.

Planetary Gear

Figure 26:
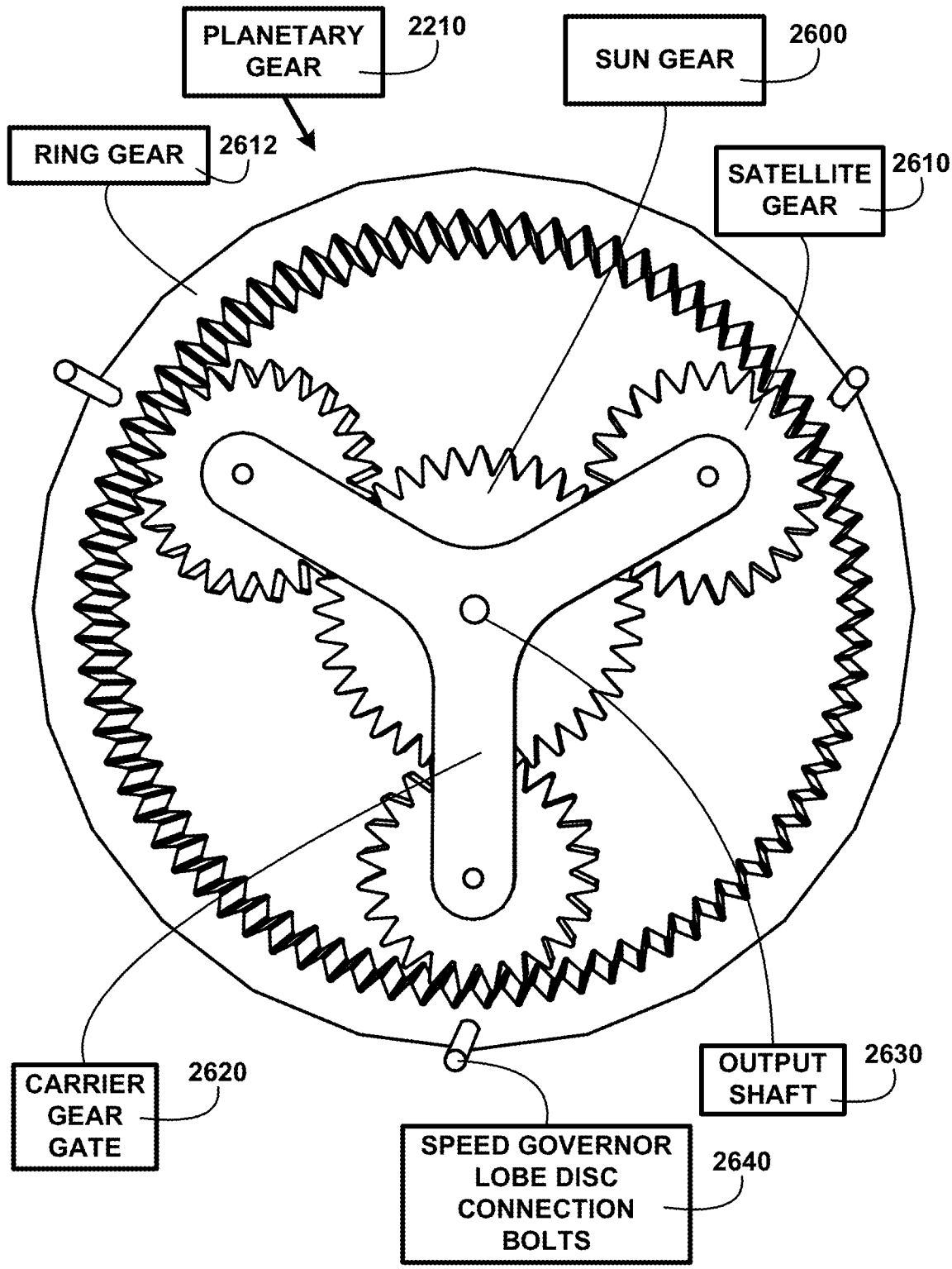
FIG. 26 shows for illustrative purposes only an example of a planetary gear of one embodiment.

FIG. 26 shows for illustrative purposes only an example of a planetary gear of one embodiment. FIG. 26 shows the planetary gear 2210. The planetary gear 2210 includes a sun gear 2600, at least three satellite gears 2610, ring gear 2612, carrier gear gate 2620, the output shaft 2630, and a plurality of speed governor 2030 lobe disc connection bolts 2640. The carrier gear gate 2620 is also referred to herein as the gate. The transmission platform can use a planetary gear set for a differential where there is an input shaft and two paths through which the input shaft energy can flow out. The planetary gear set is also referred to as an epicyclic gear train. The components of the planetary gear set can be rotated independently and can be rotated separately or jointly. Different gear ratios are achieved with rotation of the components separately or jointly. For example, the sun gear rotated with the input shaft will produce a first gear ratio. Rotating the ring gear in an opposite rotational direction to the sun gear at the same time will change the gear ratio. In another example, the input (sun gear) is rotating counter-clockwise, the output (carrier) is stationary and the outer ring is rotating clockwise. Another example is when the input is moving and the output is also moving but the ring gear is stationary, the input and output are both rotating counter-clockwise. In a third example a transition between gear ratio phases is with everything rotating. This transition is with a constant input but the output goes from stationary to rotation. The outer ring will rotate counter to the input ring and the output and input will rotate in the same direction. The gear ratios achieved can be changed with changes in the individual gear diameters. In one embodiment the continual variable transmission can employ multiple planetary gear sets to increase the availability of various gear ratios. The rate at which the energy exits is the combination of the two output shafts that equals the energy from the input shaft. Energy flows through the transmission platform.

The transmission platform is the process of directing the flow of energy between two paths at the same time. Traditional transmissions direct energy in one path at a time and vary the speed ratio between the input and output by changing this path. By selecting different gear sets to connect the rotation between the input and output shaft, different ratios can be obtained.

The transmission platform controls the difference in speed between the input and output shaft by altering the paths on that energy is allowed to flow. The two paths of the transmission platform are from the input shaft to the output shaft or the speed governor 2030. The output speed will always equal the difference between the speeds of the input speed minus the speed of the speed governor 2030.

The resistance that is applied by the speed governor 2030 redirects energy to the only other path, which is the output shaft. The computer module controls the amount of resistance either by force or timing that the speed governor 2030 is allowing rotation to be redirected. Since energy flows to the path of least resistance, as long as there is greater resistance being applied to the speed governor 2030 than what is being applied to the output shaft, the energy will flow to the path of the output shaft. For illustrative purposes, when energy flows to the input shaft, it turns the sun gear of the planetary component of the transmission platform. This component acts as the gate and is the mechanical device that splits the flow of energy into two paths. One path will transmit to the planetary gears which are connected to the output shaft and the other path is the outer ring gear which is connected to the speed governor 2030.

The speed governor 2030 controls the amount of energy or limit of speed that will be allowed to pass through the path of the speed governor 2030. In one application using a hydraulic radial piston pump as a speed governor 2030, the outer ring of the planetary gear is connected to the outer lobe ring of the hydraulic pump. The outer lobe ring rotates and is resisted by hydraulic pistons that are connected to a stationary part of the Transmission platform. The resistance of the pistons is controlled by valves that can be set to resist a set amount of force, or hydraulic pressure, being applied to the pistons or to open and close on a time basis.

The control module of the Transmission platform computes the amount or speed of resistance to be applied and controls the hydraulic valves of the pistons. The outer lobe ring can only pass at a pace allowed by the pistons on the radial piston pump. As resistance is being applied to the pistons, the process slows the pace of the outer lobe ring which redirects energy from the outer ring gear of the planetary gear to the inner planetary gears that connect to the output shaft.

Planetary Gear Connection to the Speed Governor

Figure 27:
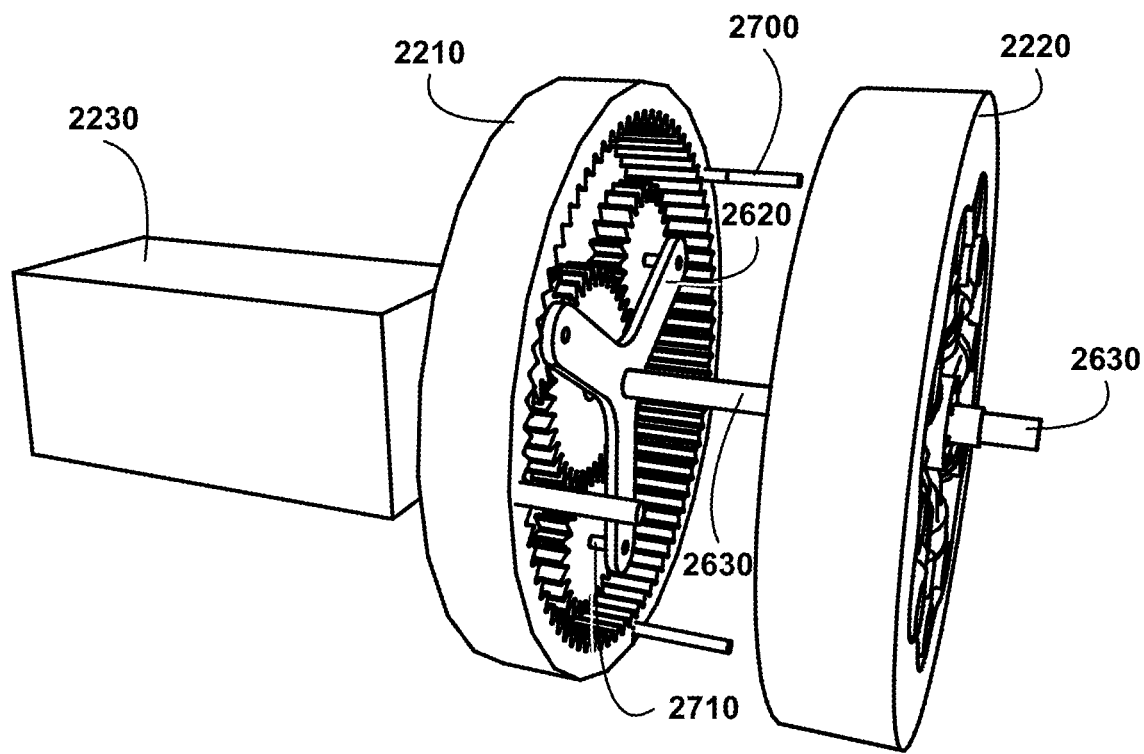
FIG. 27 shows for illustrative purposes only an example of a planetary gear connection to the speed governor of one embodiment.

FIG. 27 shows for illustrative purposes only an example of a planetary gear connection to the speed governor of one embodiment. FIG. 27 shows the power source 430 of FIG. 4 and the planetary gear 2210 separated from the speed governor with lobed disc and roller bearings connected to pistons 2220 for illustrative purposes. The carrier gear gate 820 of FIG. 8 shows a satellite gear to carrier gear gate connection pin 2710 connection. The output shaft 2630 originates from the carrier gear gate 2620 and passes through the speed governor 2030 of FIG. 20. The separation allows viewing the planetary gear to speed governor with lobed disc and roller bearings connected to pistons connection bolt 2700.

In the above, the radial piston pump was used for illustrative purposes of the mechanics of the transmission platform. In practical applications, a more custom-designed speed controller will be used since the torque and speed requirements cannot be as easily met with a radial piston design. A better design would more resemble a multi-piston caliper and disc brake setup. Instead of using a smooth disc and friction material pads, a lobed disc and roller bearings connected to pistons could be used. There are various types of speed controllers that can be created for the transmission platform depending on the particular use parameters. Depending on the torque and speed requirements, different designs might be better suited than others.

Auto industry uses of the transmission platform include energy recovery and reuse (flywheel technology). These uses increase performance with less engine size, and a more efficient manner to store and reuse power. These uses also keep recovered energy in kinetic form. No loss to convert from kinetic to electrical and back and any heat loss or restrictions from battery components.

Auto industry uses of the transmission platform also include the enablement of different engine options, for example, diesel. Diesel engines have limited operating speed ranges. Transmission platform CVT can expand the operating range allowing the engine to operate at its most efficient range while delivering increased performance. With the transmission platform CVT, speed is controlled via the transmission and not by throttling the engine.

Auto industry uses of the transmission platform include efficient use of turbine engines. Turbines operate most efficiently and deliver their most energy at very high RPMs. Transmission platform CVT allows the greater efficiency of turbines to be applied in the auto industry utilizing two key aspects, first, using the Transmission platform CVT to control the speed desired, and second integrating with flywheel technology to store energy for big on-demand needs.

Auto industry uses of the transmission platform further include an increased performance with electric motors. Energy recovery and reuse where the transmission platform CVT provides the ability to capture the kinetic energy in braking applications, store it in a flywheel efficiently and then when needed, allow it to be transmitted back to the drivetrain. High output delivery with moving energy from batteries to a drivetrain in substantial amounts creates heat and resistance. The transmission platform CVT can transmit energy in great amounts quickly, without heat or other restrictions. Electric motors have wide operating ranges, but they lose efficiencies when needed to operate in the broad range needed for high-performance applications. The transmission platform CVT can allow electric motors to stay in their most efficient range while delivering power at all desired speeds of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   separating kinetic speed from energy using a transmission platform;
   directing energy in the kinetic form at a predetermined speed from 0 to 100%;
   employing the transmission platform to increase overall efficiency; and
   integrating the transmission platform that is adaptable for performance with combustion engines and electric motors; and
   directing a predetermined speed of the energy to a planetary gear carrier gear using a speed governor coupled indirectly through a planetary carrier.

2. The method of claim 1, further comprising rotating a sun gear to divert kinetic speed from energy into two paths.

3. The method of claim 1, further comprising rotating a speed governor with a planetary gear rotated by a power source input shaft to regulate the kinetic speed to a predetermined speed.

4. The method of claim 1, further comprising operating hydraulic pumps actuated with a rotating lobed disc cam to push against roller bearings coupled to the hydraulic pumps to pressurize a hydraulic fluid to drive a carrier gear gate to reach a predetermined speed.

5. The method of claim 1, further comprising calculating a hydraulic pump pressure using a control box computer device to regulate the speed of output energy.

6. The method of claim 1, further comprising regulating hydraulic pressure within a speed governor hydraulic pump with hydraulic valves configured to partially open and close to regulate pressurization of hydraulic fluid with piston pumps through hydraulic inlet and outlet flow tubes.

7. An apparatus, comprising:
   a planetary gear coupled to a power source configured to receive input energy from the power source;
   a speed governor coupled to the planetary gear configured to regulate speed from the power source;
   a control box coupled to the speed governor configured to calculate a predetermined speed to regulate the speed governor speed;
   a power source coupled to the planetary gear configured to convey energy to the planetary gear to divert the energy into two paths; and
   a transmission platform formed from the planetary gear, speed governor, and control box configured to regulate speed and energy to devices powered from the power source.

8. The apparatus of claim 7, wherein the speed governor consists of a lobed disc cam and roller bearings connected to hydraulic pistons.

9. The apparatus of claim 7, wherein the power source consists of combustion engines and electric motors.

10. The apparatus of claim 7, wherein the planetary gear consists of a sun gear coupled to a power source input shaft, at least three satellite gears coupled to a carrier gear gate, a ring gear coupled to a speed governor lobed disc cam, a planetary carrier gate coupled to an output shaft, an output shaft, and a plurality of speed governor lobe disc connection bolts.

11. The apparatus of claim 7, wherein the speed governor consists of hydraulic inlet and outlet flow tubes coupled to hydraulic valves configured to partially open and close to regulate the pressurization of hydraulic fluid with piston pumps.

12. The apparatus of claim 7, wherein the speed governor coupled indirectly through a planetary carrier controls how much energy and at what predetermined speed the energy is directed to an output shaft coupled to the planetary carrier.

13. The apparatus of claim 7, wherein the planetary gear takes energy from the power source input shaft and separates it into two paths including a planetary carrier and the speed governor.

14. An apparatus, comprising:
   a power source coupled to the sun gear configured to convey energy to a plurality of planet gears to divert the energy into two paths;
   a planetary carrier coupled to the plurality of planet gears configured to receive input energy from the power source;
   a speed governor coupled to the planetary carrier configured to regulate speed from the power source;
   a control box coupled to the speed governor configured to calculate a predetermined speed to regulate the speed governor speed; and
   a transmission platform formed from the planetary carrier, speed governor, and control box configured to regulate speed and energy to devices powered from the power source.

15. The apparatus of claim 14, further comprising a lobed disc cam, and roller bearings connected to hydraulic pistons configured to regulate a predetermined speed of the speed governor.

16. The apparatus of claim 14, further comprising a speed governor coupled to the planetary carrier configured to transmit a predetermined speed through an output shaft.

17. The apparatus of claim 14, further comprising a plurality of hydraulic valves coupled to the speed governor configured to partially open and close to regulate the pressurization of hydraulic fluid within piston pumps.

18. The apparatus of claim 14, further comprising a sun gear coupled with the plurality of planet gears configured to receive kinetic energy at a given speed through a power source input shaft.

19. The apparatus of claim 14, further comprising an output shaft coupled to a planetary carrier configured to transfer kinetic energy at a predetermined speed to a device powered with the power source.

* * * * *